United States Patent
Yamaura et al.

(10) Patent No.: US 11,425,711 B2
(45) Date of Patent: Aug. 23, 2022

(54) TRANSMISSION DEVICE, COMMUNICATION DEVICE, COMMUNICATION SYSTEM, TRANSMISSION METHOD, AND COMPUTER PROGRAM PRODUCT

(71) Applicant: Kabushiki Kaisha Toshiba, Minato-ku (JP)

(72) Inventors: Takahiro Yamaura, Kawasaki (JP); Yasin Oge, Sagamihara (JP); Yuta Kobayashi, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 73 days.

(21) Appl. No.: 16/549,065

(22) Filed: Aug. 23, 2019

(65) Prior Publication Data
US 2020/0163082 A1    May 21, 2020

(30) Foreign Application Priority Data
Nov. 20, 2018  (JP) .............................. JP2018-217651

(51) Int. Cl.
*H04W 72/04* (2009.01)
*H04L 49/9057* (2022.01)

(52) U.S. Cl.
CPC ..... *H04W 72/0446* (2013.01); *H04L 49/9057* (2013.01)

(58) Field of Classification Search
None
See application file for complete search history.

(56) References Cited

U.S. PATENT DOCUMENTS

| | | | |
|---|---|---|---|
| 2002/0027907 A1* | 3/2002 | Tateoka | H04L 63/0236 370/389 |
| 2003/0103243 A1* | 6/2003 | Watanabe | H04N 21/2402 358/405 |
| 2005/0063392 A1* | 3/2005 | Ofuji | H04W 28/02 370/395.42 |
| 2005/0141416 A1* | 6/2005 | Kobayashi | H04L 47/525 370/229 |

(Continued)

FOREIGN PATENT DOCUMENTS

| JP | H02-299055 A | 12/1990 |
|---|---|---|
| JP | 3508051 B2 | 3/2004 |

(Continued)

OTHER PUBLICATIONS

Intel Ethernet Controller I210 DataSheet, https://www.intel.com/content/dam/www/public/us/en/documents/datasheets/i210-ethernet-controller-datasheet.pdf, Feb. 2019, 872 pages.

*Primary Examiner* — Hassan A Phillips
*Assistant Examiner* — Gautam Sharma
(74) *Attorney, Agent, or Firm* — Oblon, McClelland, Maier & Neustadt, L.L.P.

(57) ABSTRACT

A transmission device includes a receiving unit and a transmission processing unit. The receiving unit receives transmission schedule information including a frame identifier (ID) of a frame to be transmitted and a transmission parameter relating to transmission timing of the frame. The transmission processing unit transmits a frame identified by the frame ID to a receiving device, according to the transmission parameter included in the transmission schedule information.

7 Claims, 16 Drawing Sheets

(56) References Cited

U.S. PATENT DOCUMENTS

| | | | | |
|---|---|---|---|---|
| 2010/0017523 A1* | 1/2010 | Yoshiuchi | ........... | H04N 21/6375 |
| | | | | 709/228 |
| 2012/0039339 A1* | 2/2012 | Kurita | ..................... | H04L 45/00 |
| | | | | 370/400 |
| 2013/0007185 A1* | 1/2013 | McFadzean | ....... | H04N 21/2393 |
| | | | | 709/213 |
| 2013/0136218 A1* | 5/2013 | Kure | ..................... | H04L 7/0041 |
| | | | | 375/356 |
| 2013/0336250 A1* | 12/2013 | Park | ..................... | H04W 72/12 |
| | | | | 370/329 |
| 2016/0350151 A1* | 12/2016 | Zou | ........................ | H04L 67/322 |
| 2018/0302331 A1* | 10/2018 | Bush | ........................ | H04L 47/28 |
| 2019/0007344 A1* | 1/2019 | Mangin | ................. | H04L 49/351 |
| 2019/0158620 A1 | 5/2019 | Oge et al. | | |
| 2019/0166061 A1* | 5/2019 | Farkas | .................. | H04L 47/621 |
| 2019/0306075 A1* | 10/2019 | Nishimura | ............... | H04L 49/90 |

FOREIGN PATENT DOCUMENTS

| | | |
|---|---|---|
| JP | 2011-024027 A | 2/2011 |
| JP | 2018-046509 A | 3/2018 |
| JP | 2019-96930 A | 6/2019 |

\* cited by examiner

| FRAME ID | DATA STARTING POSITION | DATA LENGTH | VALID FLAG |
|---|---|---|---|
| D0 | 0 | 1514 | 1 |
| D1 | 2048 | 1514 | 1 |
| D2 | 4096 | 1514 | 0 |
|  |  |  |  |
|  |  |  |  |
|  |  |  |  |
| D(N-1) | 2048*(N-1) | 1514 | 1 |

| TRANSMISSION SCHEDULE INFORMATION | | |
|---|---|---|
| TRANSMISSION SCHEDULE ID | FRAME ID | TRANSMISSION TIME |
| S0 | D11 | T2 |
| S1 | D12 | T3 |
| S2 | D13 | T4 |
| | | |
| | | |

FIG.14

| TRANSMISSION INFORMATION | | | | | |
|---|---|---|---|---|---|
| TRANS-MISSION ID | TRANSMISSION SCHEDULE INFORMATION | | | EFFECTIVE CONDITION | RECEPTION TIME |
| | TRANSMISSION SCHEDULE ID | FRAME ID | TRANSMISSION TIME | | |
| A | S1 | D1 | T12 | T10 | T9 |
| A | S2 | D2 | T13 | T10 | T9 |
| A | S3 | D3 | T14 | T10 | T9 |
| B | S4 | D4 | T15 | T14 | T10 |
| C | S5 | D4 | T13 | T12 | T11 |
| C | S6 | D2 | T14 | T12 | T11 |
| C | S7 | D3 | T15 | T12 | T11 |
| D | S8 | D5 | T16 | T15 | T11 |
| E | S9 | D5 | T13 | T11 | T12 |
| E | S10 | D4 | T14 | T11 | T12 |
| E | S11 | D2 | T15 | T11 | T12 |
| E | S12 | D3 | T16 | T11 | T12 |

63A

TRANSMISSION DEVICE, COMMUNICATION DEVICE, COMMUNICATION SYSTEM, TRANSMISSION METHOD, AND COMPUTER PROGRAM PRODUCT

CROSS-REFERENCE TO RELATED APPLICATIONS

This application is based upon and claims the benefit of priority from Japanese Patent Application No. 2018-217651, filed on Nov. 20, 2018; the entire contents of which are incorporated herein by reference.

FIELD

Embodiments described herein relate generally to a transmission device, a communication device, a communication system, a transmission method, and a computer program product.

BACKGROUND

A communication device that performs real-time communication via a network has been known. Moreover, a technology that specifies a transmission time of a frame, and that transmits the frame at the specified transmission time has been disclosed.

However, conventionally, the frame the transmission of which is instructed is sequentially stored in a transmission queue, and it has not been possible to change the transmission order after the transmission instruction is issued. Consequently, with the conventional technology, it has been difficult to flexibly correspond to a change in the transmission order.

BRIEF DESCRIPTION OF THE DRAWINGS

FIG. 14 is a schematic diagram of a data configuration of a schedule DB.

DETAILED DESCRIPTION

A transmission device includes a receiving unit and a transmission processing unit. The receiving unit receives transmission schedule information including a frame identifier (ID) of a frame to be transmitted and a transmission parameter relating to transmission timing of the frame. The transmission processing unit transmits a frame identified by the frame ID to a receiving device, according to the transmission parameter included in the transmission schedule information.

Hereinafter, embodiments of the transmission device, a communication device, a communication system, a transmission method, and a computer program product are described in detail with reference to the accompanying drawings.

First Embodiment

Figure 1:
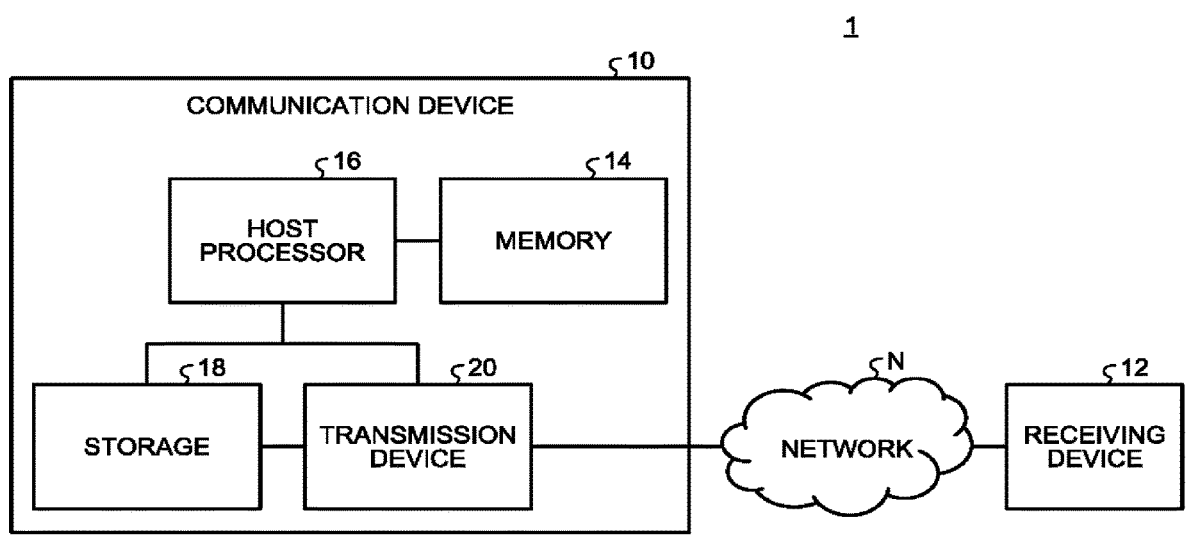
FIG. 1 is a schematic diagram of a communication system.

FIG. 1 is a schematic diagram illustrating an example of a communication system 1 of the present embodiment.

The communication system 1 includes a communication device 10 and a receiving device 12. The communication device 10 and the receiving device 12 are communicably connected via a network N.

The communication device 10 is a device for transmitting frame data to the receiving device 12. The frame data is a unit for transferring digital data. Hereinafter, the frame data may also be simply referred to as a frame. The receiving device 12 receives a frame from the communication device 10.

For example, the network N is Ethernet (registered trademark). The network N is a network corresponding to audio video bridging (AVB) and time-sensitive networking (TSN) standards defined in Institute of Electrical and Electronic Engineers (IEEE) 802.1, and the like. The network N may be any type. For example, the network N is an office network, a network inside a data center, an on-vehicle network, a factory network, a network of mobile base stations, and the like.

The communication device 10 includes a memory 14, a host processor 16, storage 18, and a transmission device 20

The memory 14 stores therein various types of data. For example, the memory 14 is a dynamic random access memory (DRAM) and the like.

The host processor 16 is connected to the memory 14 using a memory bus. Moreover, the host processor 16 is connected to the storage 18 by using a bus such as peripheral component interconnect (PCI) express (registered trademark). Moreover, the host processor 16 is connected to the transmission ice 20 by using a bus such as the PCI Express (registered trademark).

The host processor 16 executes a process by developing a computer program read out from the storage 18 on the memory 14, and while reading a command and data on the memory 14. The process is executed by one or more cores provided in the host processor 16. For example, the host processor 16 is a central processing unit (CPU) and the like.

For example, the storage 18 is a hard disk drive (HDD), a solid state drive (SSD), and the like.

The transmission device 20 connects the host processor 16 to the network N. More specifically, the transmission device 20 is a network interface controller.

For example, the transmission device 20 is implemented by an application specific integrated circuit (ASIC), a field-programmable gate array (FPGA), and the like. Moreover, the transmission device 20 may be implemented by a combination of the ASIC, the FPGA, and a general processor. Furthermore, the transmission device 20 may be implemented as a chip different from the host processor 16, or may be implemented as a single chip such as a system-on-a-chip (SoC).

Figure 2:
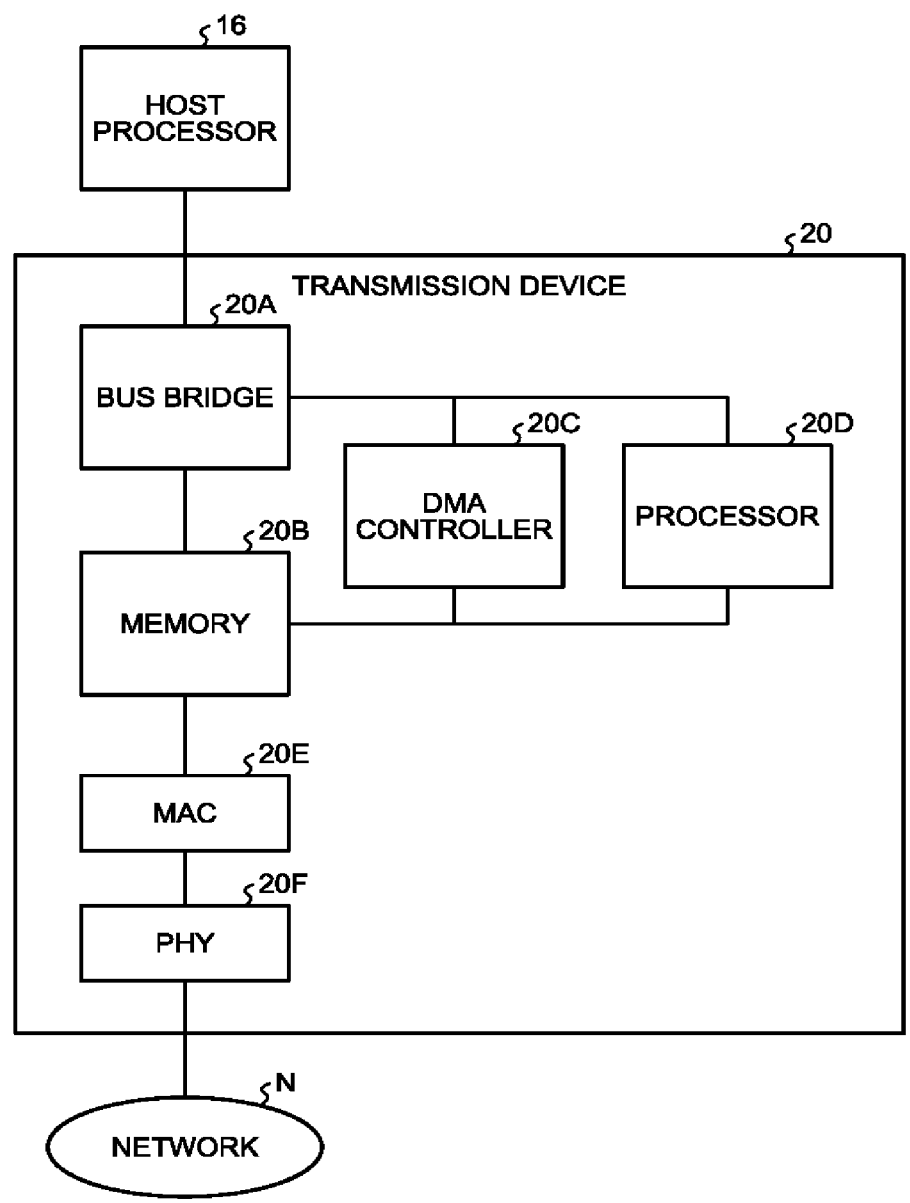
FIG. 2 is a schematic diagram of a hardware configuration of a transmission device.

FIG. 2 is a schematic diagram illustrating an example of a hardware configuration of the transmission device 20.

The transmission device 20 includes a bus bridge 20A, a memory 20B, a direct memory access (DMA) controller 20C, processor 20D, a media access controller (MAC) 20E, and a physical layer interface (PHY) 20F.

The bus bridge 20A bridges a bus connected to the host processor 16, and buses of the memory 20B, the DMA controller 20C, and the processor 20D in the transmission device 20. The DMA controller 20C transfers data between the memory 14 (see FIG. 1) connected to the host processor 16, and the memory 20B in the transmission device 20.

The processor 20D interacts with the host processor 16, and sets and controls the MAC 20E and the PHY 20F. The processor 20D is implemented by the FPGA, the ASIC, the CPU, or the like.

The memory 20B stores therein a frame to be transmitted and accompanying information, which will be described below. The memory 20E is implemented by a static random access memory (SRAM) and the like. The MAC 20E is hardware that performs protocol processing on a data link layer. The PHY OF is hardware that performs protocol processing on a physical layer. For example, the PHY 20F performs a transmission process in Ethernet (registered trademark). For example, the memory 205, the MAC 20E, and the PHY 2CF are implemented by the FPGA, the ASIC, and the like.

Figure 3:
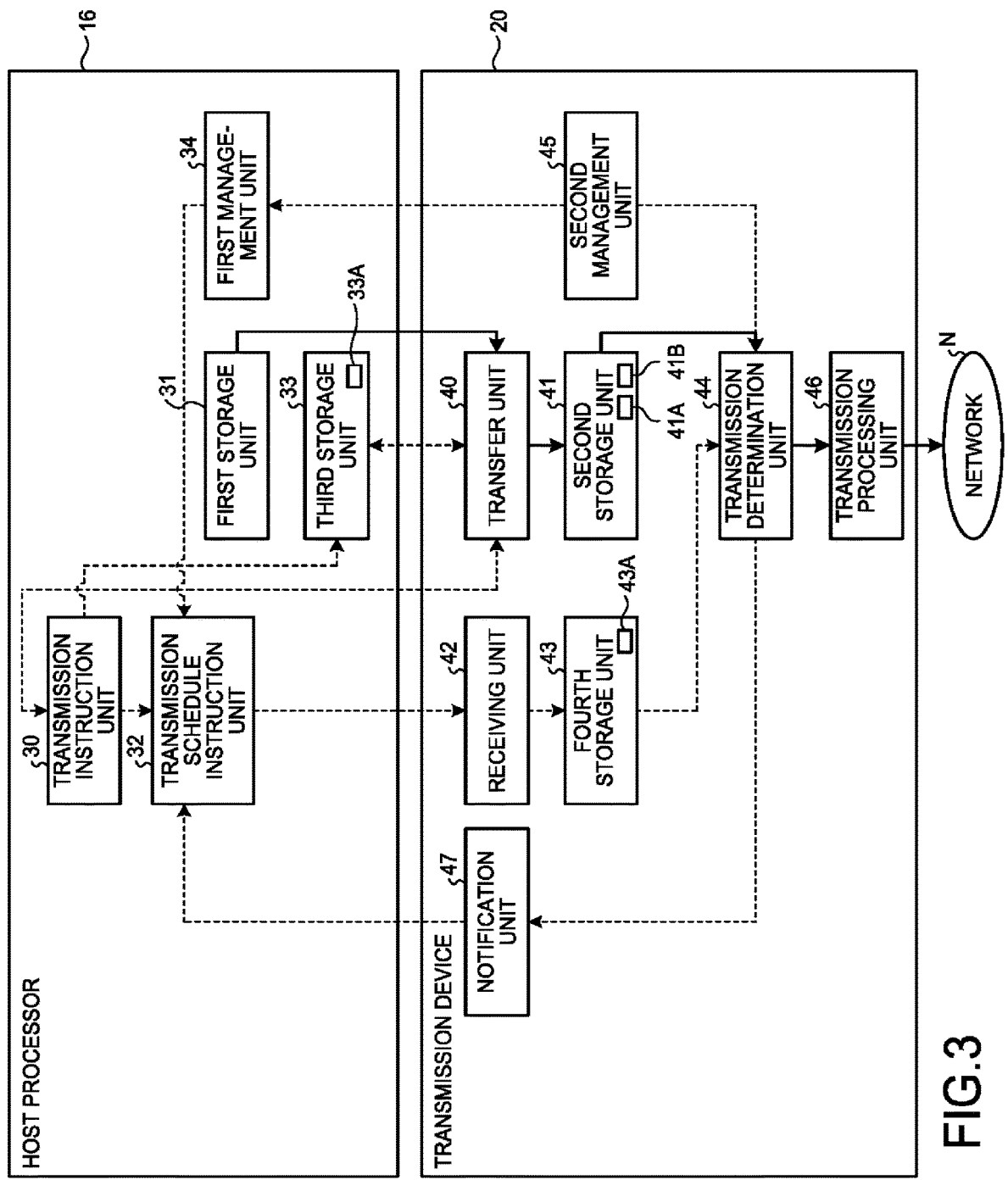
FIG. 3 is a schematic diagram of a functional configuration of a host processor and the transmission device.

FIG. 3 is a schematic diagram illustrating an example of a functional configuration of the host processor 16 and the transmission device 20. In FIG. 3, the solid line arrow indicates the flow of data, and the broken line arrow indicates the flow of control.

The host processor 16 includes a transmission instruction unit 30, a first storage unit 31, a transmission schedule instruction unit 32, a third storage unit 33, and a first management unit 34. For example, at least one of the transmission instruction unit 30, the transmission schedule instruction unit 32, and the first management unit 34 is implemented by one or more processors. For example, the units described above may also be implemented by causing processor such as the CPU to execute a computer program, in other words, software. The units described above may also be implemented by a processor such as a dedicated integrated circuit (IC), in other words, hardware. The units described above may also be implemented by combining software and hardware. When the processors are used, each of the processors may implement one of the units, or may implement two or more of the units.

The transmission device 20 includes a transfer unit 40, a second storage unit 41, a receiving unit 42, a fourth storage unit 43, a transmission determination unit 44, a second management unit 45, and a transmission processing unit 40. For example, at least one of the transfer unit 40, the receiving unit 42, the transmission determination unit 44, the second management unit 45, and the transmission processing unit 40 is implemented by one or more processors. For example, the units described above may also be implemented by causing a processor such as the CPU to execute a computer program, in other words, software. The units described above may also be implemented by a processor such as a dedicated IC, in other words, hardware. The units described above may also be implemented by combining software and hardware. When the processors are used, each of the processors may implement one of the units, or may implement two or more of the units.

In the host processor 16, an application program (hereinafter, may also be referred to as an application) that operates on the host processor 16 writes a frame to be transmitted to the receiving device 12 in the first storage unit 31, and instructs the transmission instruction unit to transmit the frame.

The application described above instructs the transmission instruction unit 30 to transmit the frame, by transmitting a frame transmission instruction to the transmission instruction unit 30.

The frame transmission instruction includes a starting address indicating a storage location of the frame to be transmitted in the first storage unit 31, data length of the frame, and the priority of the frame. The priority is information indicating the transmission priority of the frame to the receiving device 12. For example, the priority is set by an application. Moreover, the priority may be the priority itself, or may be an identifier of a queue corresponding to the priority, for example. The identifier may also be a traffic class defined in the IEEE 802.1Q.

The transmission instruction unit 30 instructs to transmit a frame. Upon receiving a frame transmission instruction from an application, the transmission instruction unit 30 notifies the transfer unit 40 of a transfer instruction. The transfer instruction is an instruction to transfer a frame that is stored in a location indicated by the starting address included in the frame transmission instruction received from an application, from the first storage unit 31 to the second storage unit 41 in the transmission device 20. The transmission instruction unit 30 executes the transfer instruction by writing a descriptor 33A in the third storage unit 33, and notifying the transfer unit 40 in the transmission device 20 of the number of the descriptor 33A.

Figure 4:
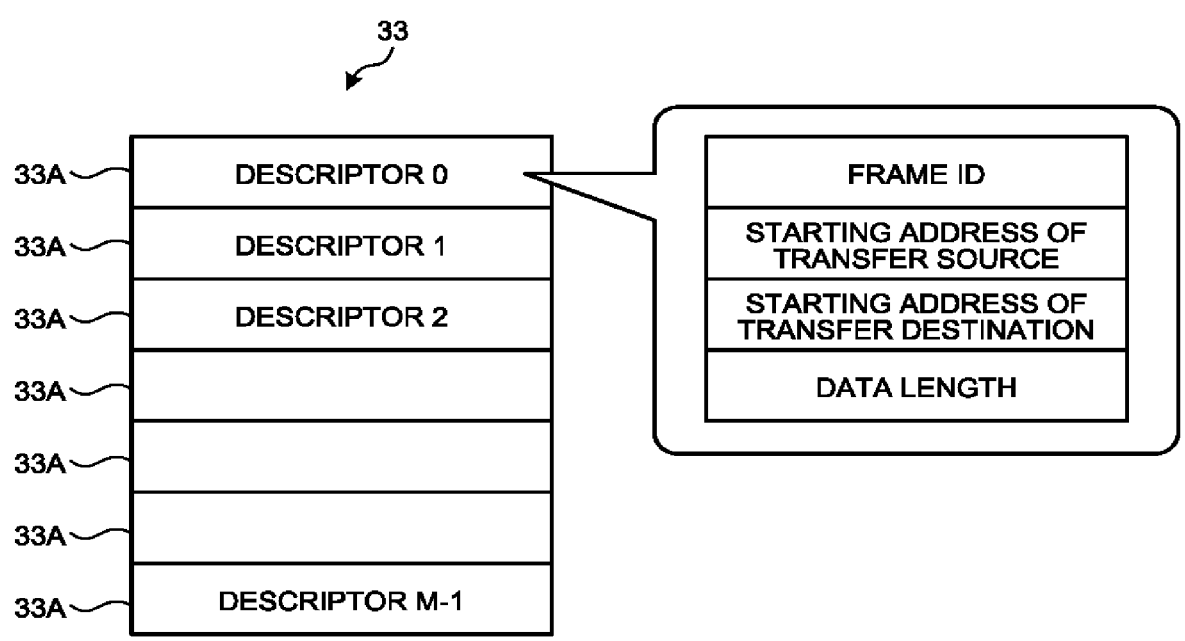
FIG. 4 is a schematic diagram of a structure of a descriptor.

FIG. 4 is a schematic diagram illustrating an example of a structure of the descriptor 33A. As illustrated in FIG. 4, a plurality of the descriptors 33A is arranged in the third storage unit 33. Each of the descriptors 33A includes a frame ID, a starting address of a transfer source, a starting address of a transfer destination, and a data length.

The frame ID is an identifier capable of uniquely identifying a frame. To avoid the same frame ID from being allocated to different frames, the transmission instruction unit 30 allocates a frame ID to each frame. Consequently, when it is decided that once used frame ID is not to be used in the host processor 16 and the transmission device 20, the transmission instruction unit 30 reuses the frame ID and allocates the frame ID to the other frame.

The starting address of the transfer source indicates the leading address of the frame stored in the first storage unit 31. The starting address of the transfer destination indicates the leading address of a location in which the frame is to be written, in the second storage unit 41 that is a transfer destination of the frame. The data length indicates the data length of a frame. The transmission instruction unit 30 may also use the starting address of the transfer destination as a frame ID.

Returning to FIG. 3, description will be continued. The transfer unit 40 in the transmission device 20 transfers the frame to be transmitted to the second storage unit 41. Upon receiving a transfer instruction from the transmission instruction unit 30 in the host processor 16, the transfer unit 40 transfers the frame indicated by the transfer instruction from the first storage unit 31 in the host processor 16 to the second storage unit 41 in the transmission device 20.

In particular, the transfer unit 40 reads out the descriptor 3A corresponding to the number of the descriptor 33A indicated in the transfer instruction, from the third storage unit 33. The transfer unit 40 then reads out the data with the data length in the descriptor 33A from the first storage unit 31, from the starting address of the transfer source in the read descriptor 33A. Through this process, the transfer unit 40 reads out the frame identified by the frame ID included in the read descriptor 33A as much as the data length, from the starting address of the transfer source in the first storage unit 31. The transfer unit 40 then writes the read frame in an area in the second storage unit 41, indicated by the starting address of the transfer destination included in the read descriptor 33A. Through these processes, the transfer unit 40 transfers the frame to be transmitted indicated by the transfer instruction, from the first storage unit 31 to a frame storage area 41A in the second storage unit 41.

Figures 5A, 5B:
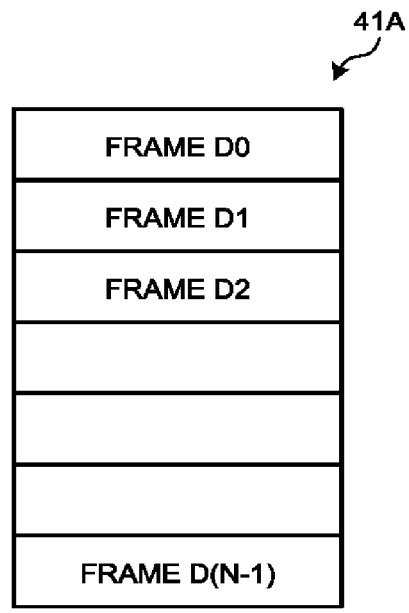
FIG. 5A is a schematic diagram of a data structure of a frame storage area.
FIG. 5B is a schematic diagram of a data structure of an accompanying information storage area.

FIG. 5A is a schematic diagram illustrating an example of a data structure of the frame storage area 41A in the second storage unit 41.

The transfer unit 40 writes the frame read out from the first storage unit 31, in an area in the second storage unit 41 indicated by the starting address of the transfer destination in the read descriptor 33A. Through this process, the frame to be transmitted is written in the frame storage area 41A in the second storage unit 41.

When the frame is written in the frame storage area 41A in the second storage unit 41, the transfer unit 40 writes accompanying information in an accompanying information storage area 41B.

FIG. 5B is a schematic diagram illustrating an example of a data structure of the accompanying information storage area 41B in the second storage unit 41.

The accompanying information storage area 41B is a storage area in the second storage unit 41 for storing accompanying information. The accompanying information includes a frame ID, a data starting position, a data length, and a valid flag. The accompanying information manages the data starting position, the data length, and the valid flag corresponding to the frame ID. The transfer unit 4C writes the frame ID, the starting address of the transfer destination, and the data length included in the read descriptor 33A in the accompanying information storage area 41B, as the frame ID, the data starting position, and the data length of the accompanying information.

The valid flag indicates whether the frame identified by the corresponding frame ID is valid or invalid. In FIG. 5B, a valid flag "1" indicates valid, and a valid flag "0" indicates invalid. In the initial state, it is assumed that the valid flag is invalid "0". When the accompanying information storage area 41B is initialized, the transfer unit 40 may set all the valid flags to invalid "0". It is to be noted that the accompanying information storage area 41B may not include the valid flag, and may assume valid when the corresponding data length is greater than "0", and assume invalid when the corresponding data length is "0".

Returning to FIG. 3, description will be continued. When the frame is written in the frame storage area 41A described above, and the accompanying information is written in the accompanying information storage area 418, the transfer unit 40 finishes transferring the frame to be transmitted, from the first storage unit 31 in the host processor 16 to the second storage unit 41 in the transmission device 20.

When the frame has been transferred from the first storage unit 31 to the second storage unit 41, the transfer unit 40 notifies the transmission instruction unit 30 in the host processor 16 of completion of transfer. The notification of completion of transfer is performed by notifying the transmission instruction unit 30 of the number of the descriptor 3A of the frame that has been transferred.

After the transfer instruction of the frame is notified to the transfer unit 40, the transmission instruction unit 30 executes a transmission schedule process on the frame that is transferred to the transmission device 20 indicated by the transfer instruction. In other words, in the present embodiment, the transmission instruction unit 30 first issues a transfer instruction of a frame to be transmitted to the receiving device 12 from the first storage unit 31 to the second storage unit 41 in the transmission device 2C, and then executes a transmission schedule process of the frame. The transmission schedule process is a process for setting a transmission schedule of the frame to the receiving device 12.

Based on the frame transmission instruction received from an application, the transmission instruction unit 30 notifies the transmission schedule instruction unit 32 of the priority of the frame to be transmitted, the data length of the frame, and the frame ID applied to the frame that are indicated in the transfer instruction notified to the transfer unit 40. The priority of the frame is priority included in the frame transmission instruction received from the application.

The transmission schedule instruction unit 32 generates transmission schedule information using the priority, the data length, and the frame ID of the frame received from the transmission instruction unit 30, and notifies the transmission device 20 of the transmission schedule information.

More particularly, the transmission schedule instruction unit 32 acquires the current time from the first management unit 34 that manages time. Then, the transmission schedule instruction unit 32 generates transmission schedule information using the priority, the data length, the frame ID of the frame, and the current time.

The transmission schedule information includes a transmission schedule ID, a frame ID, and the transmission time. The transmission schedule information may be information that at least includes the frame ID and the transmission time.

The transmission schedule ID is an identifier for uniquely identifying the transmission schedule information. The transmission schedule instruction unit 32 may allocate a uniquely identifiable identifier to each piece of transmission schedule information, as the transmission schedule ID. At the same time, the transmission schedule instruction unit 32 may allocate the transmission schedule ID so that the same ID will not be allocated to different pieces of transmission schedule information.

The transmission time is an example of a transmission parameter. The transmission parameter is information relating to transmission timing of a frame. The transmission parameter is indicated by a transmission time, a transmission order, and the like. In the present embodiment, the transmission parameter is a transmission time, for example. More particularly, the transmission time is time at which the transmission device 20 starts transmitting a frame.

The transmission schedule instruction unit 32 calculates the transmission time of a frame identified by the frame ID, by using the priority, the data length, and the frame ID of the frame, and the current time.

For example, the transmission schedule instruction unit 32 may also perform time-aware shaping that is a transmission control defined in IEEE 802.1Qbv, by using a gate control list for the control information for transmitting a frame. Moreover, the transmission schedule instruction unit 32 may perform credit-based shaping defined in IEEE 802.1Qav, by using a credit value as the control information. The transmission schedule instruction unit 32 may also use the time defined in IEEE 802.1AS directly as the transmission time. Furthermore, the transmission schedule instruction unit 32 may calculate the transmission time using any low-order bit, by taking into consideration circulation.

The transmission schedule instruction unit 32 may calculate the transmission time of a frame identified by the frame ID, for each frame ID. In other words, the transmission schedule instruction unit 32 may calculate the transmission time for each piece of transmission schedule information.

The transmission schedule instruction unit 32 then notifies the receiving unit 42 in the transmission device 20 of the transmission information including one or more pieces of transmission schedule information. In other words, the transmission information may include a single piece of transmission schedule information including a set of the frame ID and the transmission time, or may include a plurality of pieces of transmission schedule information including a set of the frame ID and the transmission time. In the present embodiment, the transmission information includes a single piece of transmission schedule information, for example. Moreover, in the present embodiment, the transmission schedule information includes a transmission schedule ID, a frame ID, and the transmission time, for example. The transmission information may also include a transmission ID for identifying the transmission information.

The receiving unit 42 in the transmission device 20 receives transmission schedule information from the transmission schedule instruction unit 32 in the host processor 16. In other words, by receiving the transmission information from the transmission schedule instruction unit 32, the receiving unit 42 receives the transmission schedule information included in the transmission information.

In the present embodiment, the receiving unit 42 provides a register interface corresponding to each of the transmission schedule ID, the frame ID, and the transmission time, to the transmission schedule instruction unit 32. Consequently, the transmission schedule instruction unit 32 sets the transmission schedule information in the receiving unit 42, by sequentially writing the transmission schedule ID the frame ID, and the transmission time in each register of the receiving unit 42 in this order. The interface between the receiving unit 42 and the transmission schedule instruction unit 32 is not limited to the form described above. For example, similar to the transfer unit 40, the receiving unit 42 may temporarily store the transmission schedule information in the memory, and acquire the transmission schedule information from the transmission schedule instruction unit 32 by the DMA transfer or the like.

The receiving unit 42 registers the transmission schedule information received from the transmission schedule instruction unit 32 in a schedule DB 43A of the fourth storage unit 43.

Figures 6, 7:
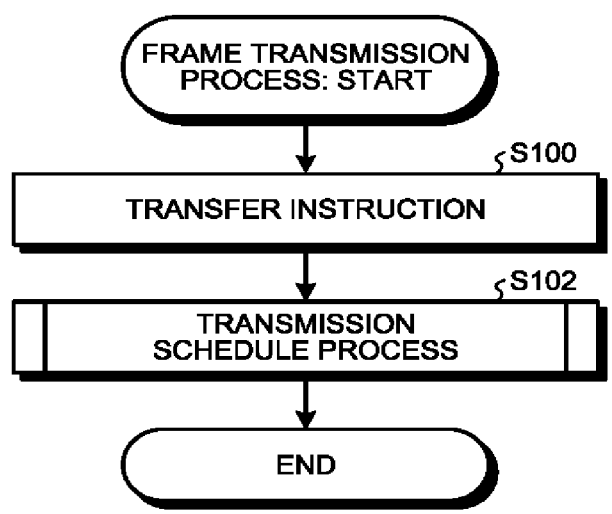
FIG. 6 is a schematic diagram of a data configuration of a schedule DB.
FIG. 7 is a flowchart of a frame transmission process.

FIG. 6 is a schematic diagram illustrating an example of a data configuration of the schedule DB 43A. The schedule DB 43A is database that stores therein transmission schedule information. The data format of the schedule DB 43A is not limited to database.

Every time the transmission schedule information is received from the transmission schedule instruction unit 32, the receiving unit 42 sequentially registers the received transmission schedule information in the schedule DB 43A of the fourth storage unit 43. Consequently, for example, as illustrated in FIG. 6, the transmission schedule information is sequentially registered in the schedule DR 43A.

Returning to FIG. 3, description will be continued. The transmission determination unit 44 determines the frame to be transmitted to the receiving device 12, based on the transmission time included in the transmission schedule information.

More particularly, the transmission determination unit 44 reads out the transmission schedule information from the schedule DB 43A in the fourth storage unit 43. It is assumed that a suitable exclusive process is performed so that the reading of the schedule DB 43A performed by the transmission determination unit 44 does not overlap with the writing of the schedule DB 43A performed by the receiving unit 42.

The transmission determination unit 44 reads out the transmission schedule information including the transmission time that matches with the current time, from the schedule DB 43A. It is to be noted that the transmission determination unit 44 may acquire the current time from the second management unit 45. The second management unit 45 manages time by synchronizing with the first management unit 34 in the host processor 16. Consequently, the transmission determination unit 44 acquires the current time from the second management unit 45 that is managed so as to count the same time as that of the host processor 16. The transmission time may also be a value obtained by subtracting a certain time, by taking into consideration the time required for performing the process by the transmission processing unit 46.

The transmission determination unit 44 may determine the transmission time that matches with the current time, by determining the presence of the transmission time included within a certain range of the current time, using the resolution of the transmission time and the current time. It is assumed that the schedule DB 43A includes the transmission schedule information including the transmission time that matches with the current time. In this case, the transmission determination unit 44 reads out the valid flag corresponding to the frame ID included in the transmission schedule information, from the accompanying information storage area 41E. When the read valid flag indicates valid "1", the transmission determination unit 44 reads out the frame from the frame storage area 41A in the second storage unit 41, and instructs the transmission processing unit 46 to transmit the frame.

The transmission processing unit 46 transmits the frame identified by the frame ID to the receiving device 12, according to the transmission time included in the transmission schedule information. The transmission processing unit 46 transmits the frame to the receiving device 12 via the network N, by using the MAC 20E and the PHY 20F (see FIG. 2). In other words, the transmission processing unit 46 transmits the frame that is determined to be transmitted by the transmission determination unit 44, to the receiving device 12. Through this process, the transmission processing unit 46 transmits the frame identified by the frame ID included in the transmission schedule information to the receiving device 12, at the transmission time included in the transmission schedule information.

When the transmission processing unit 46 has finished transmitting the frame, the transmission determination unit 44 sets the valid flag corresponding to the frame ID of the transmitted frame in the accompanying information storage area 41B to invalid "0". Moreover, the transmission determination unit 44 notifies a notification unit 47 of the transmission result information. The notification unit 47 notifies the transmission schedule instruction unit 32 in the host processor 16 of the transmission result information received from the transmission determination unit 44.

The transmission result includes a transmission result indicating a successful transmission or a failed transmission, and a transmission schedule ID. The successful transmission indicates that the transmission to the receiving device 12 has finished before the transmission time included in the transmission schedule information. The failed transmission indicates that the transmission to the receiving device 12 has not finished before the transmission time included in the transmission schedule information.

The transmission determination unit 44 then removes transmission schedule information including the frame ID of the successfully transmitted frame and the transmission time, from the schedule DB 43A.

Upon receiving the transmission result information, the transmission schedule instruction unit 32 in the host processor 16 executes post-processing. More particularly, when the transmission result included in the transmission result information indicates the successful transmission, the transmission schedule instruction unit 32 acquires the frame ID corresponding to the transmission schedule ID included in the transmission result information. The transmission schedule instruction unit 32 then makes the acquired transmission schedule ID and the frame ID reusable for the other transmission schedule ID and the frame ID.

On the other hand, when the transmission result included in the transmission result information indicates failed transmission, the transmission schedule instruction unit 32 reuses the transmission schedule ID included in the transmission result information, and recalculates the transmission time. The transmission schedule instruction unit 32 notifies the receiving unit 42 in the transmission device 20 of the transmission schedule information including the recalculated transmission time and the transmission schedule ID, and the frame ID associated to the transmission schedule ID. Consequently, the transmission schedule instruction unit 32 can calculate new transmission time corresponding to the frame that is failed to be transmitted, and notify the receiving unit 42 of the transmission schedule information relating to the frame again. The transmission schedule ID may be reused as described above. When the transmission has failed, the transmission schedule ID may be removed, make the transmission schedule ID reusable, and notify anew by using the transmission schedule ID.

Upon receiving the transmission result information including the transmission result indicating the successful transmission from the notification unit 47, the transmission schedule instruction unit 32 may remove the transmission schedule information including the frame ID of the successfully transmitted frame and the transmission time, from the schedule DB 43A. In this case, the transmission schedule instruction unit 32 may notify the receiving unit 42 of the transmission schedule ID to be removed. Then, the receiving unit 42 may remove the transmission schedule information identified by the transmission schedule ID from the schedule DB 43A.

Next, an example of a procedure of information processing executed by each of the function units in the host processor 16 and the transmission device 20 of the present embodiment will be described. It is to be noted that the transmission instruction unit 30, the transmission schedule instruction unit 32, the transfer unit 40, the receiving unit 42, the fourth storage unit 43, the transmission determination unit 44, and the transmission processing unit 46 execute the processes executed by the following function units in parallel. Consequently, a part of the processes executed by the function units are executed in parallel during an overlapping period.

FIG. 7 is a flowchart illustrating an example of a procedure of a frame transmission process executed by the transmission instruction unit 30.

Upon receiving a frame transmission instruction from an application, the transmission instruction unit 30 notifies the transfer unit 40 in the transmission device 20 of a transfer instruction (step S100). The transmission instruction unit 30 performs the transfer instruction, by writing the descriptor 33A in the third storage unit 33, and notifying the transfer unit 40 in the transmission device 20 of the number of the descriptor.

Next, the transmission instruction unit 30 executes the transmission schedule process (step S102). The details of the transmission schedule process will be described below. Thus, the present routine is finished.

Figure 8:
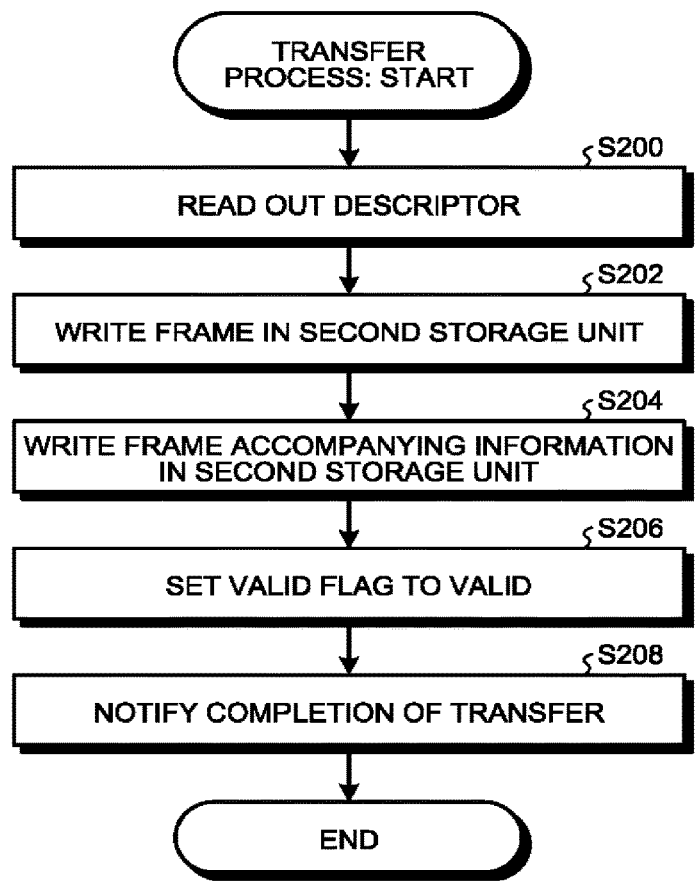
FIG. 8 is a flowchart of a transfer process.

Next, an example of a procedure of a transfer process executed by the transfer unit 40 will be described. FIG. 8 is a flowchart illustrating an example of a procedure of a transfer process executed by the transfer unit 40.

Upon receiving a transfer instruction from the transmission instruction unit 30 in the host processor 16, the transfer unit 40 reads out the descriptor 33A corresponding to the number indicated in the transfer instruction from the third storage unit 33 (step S200). The transfer unit 40 then reads out the frame to be transmitted from the first storage unit 31, by reading out the data as much as the data length included in the descriptor 33A, from the starting address of the transfer source included in the read descriptor 33A, in the first storage unit 31.

The transfer unit 40 then writes the read frame in an area in the second storage unit 41 indicated by the starting address of the transfer destination that is included in the descriptor 33A read at step S200 (step S202).

Next, the transfer unit 40 writes the accompanying information in the accompanying information storage area 41B (step S204). In this process, the transfer unit 40 sets the valid flag corresponding to the frame ID of the frame transferred to the second storage unit 41 at step S202, to valid "1" (step S206).

By performing the processes from step S200 to step S206, the transfer unit 40 transfers the frame to be transmitted from the first storage unit 31 to the frame storage area 41A in the second storage unit 41.

Next, the transfer unit 40 notifies the transmission instruction unit 30 in the host processor 16 of completion of transfer (step S208). Thus, the present routine is finished.

Next, the transmission schedule process (step S102 in FIG. 7) to be executed by the transmission schedule instruction unit 32 will be described in detail.

Figure 9:
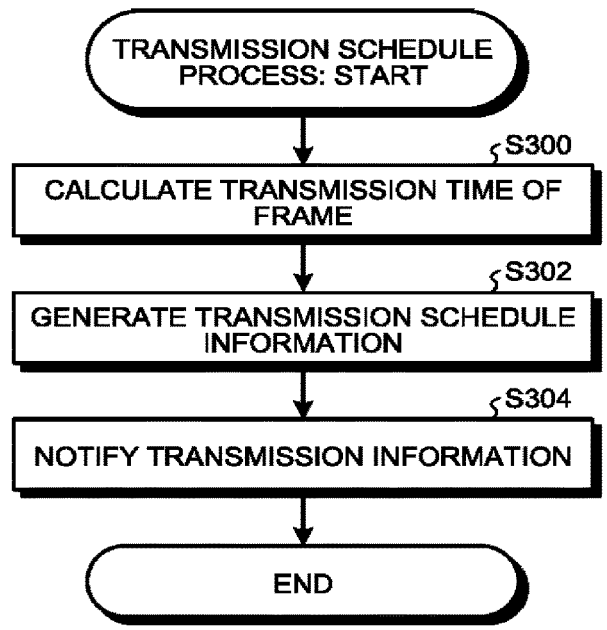
FIG. 9 is a flowchart of a transmission schedule process.

FIG. 9 is a flowchart illustrating an example of a procedure of a transmission schedule process executed by the transmission schedule instruction unit 32.

First, by using the priority, the data length, and the frame ID of the frame received from the transmission instruction unit 30, and the current time received from the first management unit 34, the transmission schedule instruction unit 32 calculates the transmission time of the frame (step S200).

Next, the transmission schedule instruction unit 32 applies the transmission schedule ID, and generates transmission schedule information including the transmission schedule ID, the frame ID, and the transmission time calculated at step S300 (step S302).

Then, the transmission schedule instruction unit 32 notifies the receiving unit 42 in the transmission device 20 of the transmission information including one or more pieces of the transmission schedule information generated at step S302 (step S304). Thus, the present routine is finished.

Next, an example of a procedure of the transmission schedule setting process executed by the receiving unit 42 will be described.

Figure 10:
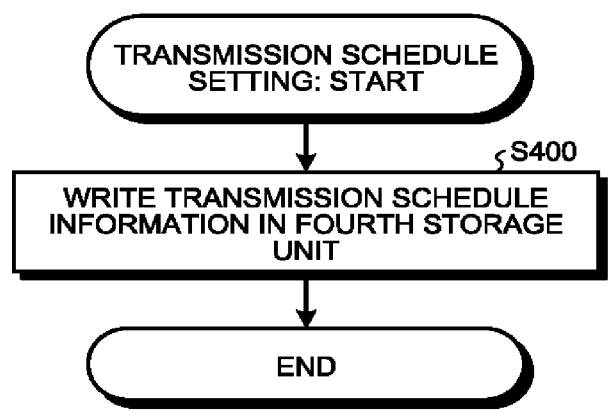
FIG. 10 is a flowchart of a transmission schedule setting process.

FIG. 10 is a flowchart illustrating an example of a procedure of a transmission schedule setting process executed by the receiving unit 42.

Upon receiving the transmission schedule information from the transmission device 20, the receiving unit 42 writes the received transmission schedule information in the fourth storage unit 43 (step S400). By registering the transmission schedule information in the schedule DB 43A of the fourth storage unit 43, the receiving unit 42 writes the transmission schedule in the fourth storage unit 43. Thus, the present routine is finished.

Next, an example of a procedure of the transmission process executed by the transmission determination unit 44 and the transmission processing unit 46 will be described.

Figure 11:
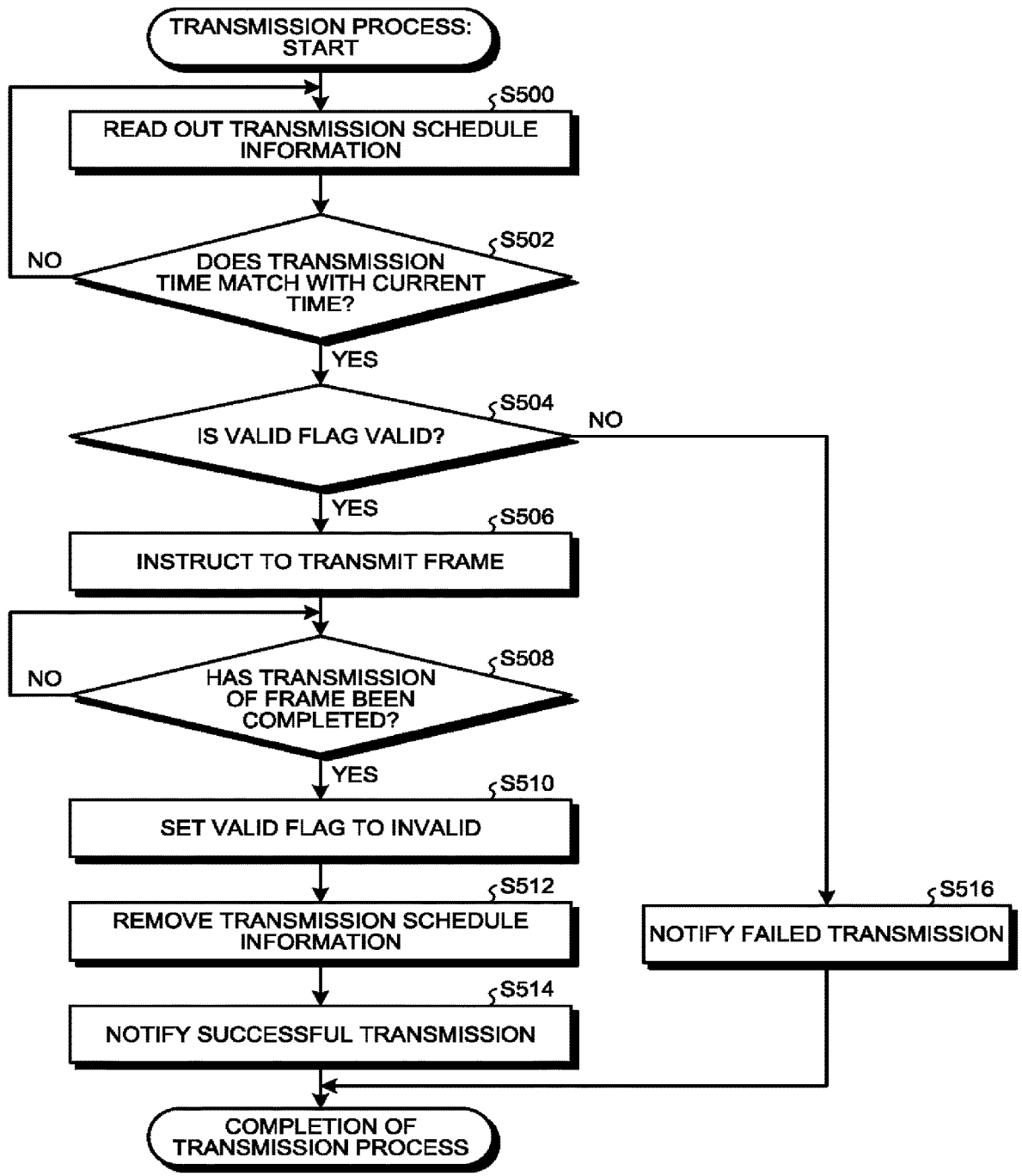
FIG. 11 is a flowchart of a transmission process.

FIG. 11 is a flowchart illustrating an example of a procedure of a transmission process executed by the transmission determination unit 44 and the transmission processing unit 46.

First, the transmission determination unit 44 reads out the transmission schedule information from the schedule DB 43A in the fourth storage unit 43 (step S500). Then, the transmission determination unit 44 determines whether the transmission time included in the transmission schedule information read out at step S500 matches with the current time (step S502). When a negative determination is made at step S502 No at step S502), the process returns to step S500 described above. When a positive determination is made at step S502 (Yes at step S502), the process proceeds to step S504.

At step S504, the transmission determination unit 44 determines whether the valid flag that is read out in the process from step S500 to step S502, and that corresponds to the frame ID included in the transmission schedule information in which the transmission time matches with the current time is valid or invalid (step S504). At step S504, the transmission determination unit 44 judges the valid flag corresponding to the frame ID in the accompanying information storage area 41B.

When it is determined that the valid flag is valid (Yes at step S504), the process proceeds to step S506. At step S506, the transmission determination unit 44 reads out the frame identified by the frame ID from the frame storage area 41A in the second storage unit 41, and instructs the transmission processing unit 46 to transmit the frame (step S506).

By the process at step S506, the transmission processing unit 46 transmits the frame to the receiving device 12. In other words, the transmission processing unit 46 transmits the frame identified by the frame ID included in the transmission schedule information to the receiving device 12, at the transmission time included in the transmission schedule information.

Next, the transmission determination unit 44 repeats the negative determination until it is determined that the transmission of the frame the transmission of which is instructed at step S506, to the receiving device 12 has been completed (No at step S506). When a positive determination is made at step S508 (Yes at step S508), the process proceeds to step S510.

At step S510, the transmission determination unit 44 sets the valid flag corresponding to the frame ID of the frame transmitted at step S508 in the accompanying information storage area 41B, to invalid "0" (step S510).

Next, the transmission determination unit 44 removes the transmission schedule information formed of a set of the frame ID of the frame transmitted at step S506 and the transmission time, from the schedule DB 43A (step S512). In this process, the transmission determination unit 44 removes the transmission schedule information corresponding to the transmission schedule ID that corresponds to the frame ID, from the schedule DB 43A. The transmission determination unit 44 then notifies the transmission schedule instruction unit 32 in the host processor 16 of the transmission result information including the transmission result indicating the successful transmission, via the notification unit 47 (step S514). Thus, the present routine is finished.

On the other hand, when a negative determination is made at step S504 described above (No at step S516), the process proceeds to step S516. At step S516, the transmission determination unit 44 notifies the transmission schedule instruction unit 32 in the host processor 16 of the transmission result information including the transmission result indicating the failed transmission, via the notification unit 47 (step S516). Thus, the present routine is finished.

Next, an example of a procedure of post-processing executed by the transmission schedule instruction unit 32 will be described.

Figure 12:
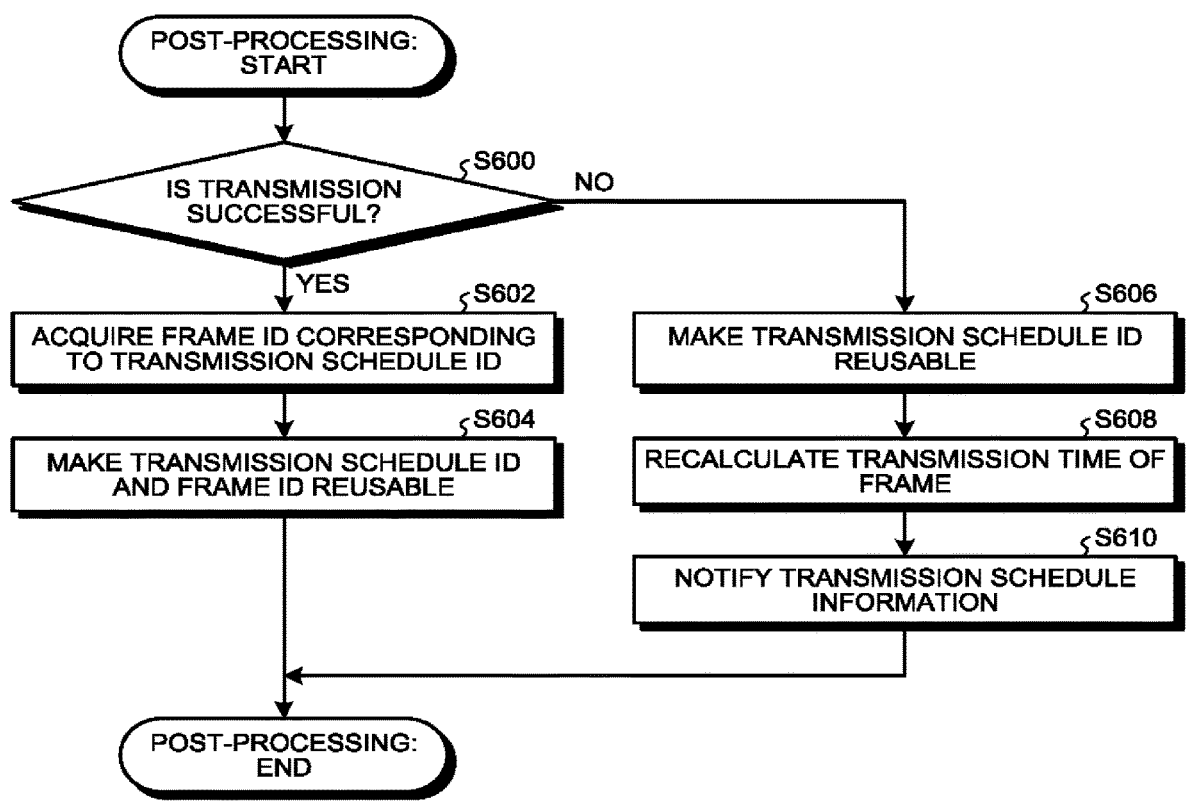
FIG. 12 is a flowchart of post-processing.

FIG. 12 is a flowchart illustrating an example of a procedure of post-processing executed by the transmission schedule instruction unit 32.

Upon receiving the transmission result information from the notification unit 47 in the transmission device 20, the transmission schedule instruction unit 32 in the host processor 16 determines whether the transmission result included in the transmission result information indicates successful transmission (step S600).

When the transmission result is indicative of successful transmission (Yes at step S600), the process proceeds to step S602. At step S602, the transmission schedule instruction unit 32 acquires the frame ID corresponding to the transmission schedule ID included in the transmission result information (step S602). The transmission schedule instruction unit 32 then makes the acquired transmission schedule ID and the frame ID reusable for the other transmission schedule ID and the frame ID (step S604). Thus, the present routine is finished.

On the other hand, when the transmission result included in the transmission result information indicates failed transmission (No at step S600), the transmission schedule instruction unit 32 proceeds to step S606. At step S606, the transmission schedule instruction unit 32 makes the transmission schedule ID included in the transmission result information reusable (step S606). The transmission schedule instruction unit 32 then recalculates the transmission time of the frame that is failed to be transmitted (step S608).

Then, the transmission schedule instruction unit 32 notifies the receiving unit 42 in the transmission device 20 of the transmission schedule information including the recalculated transmission time, the transmission schedule ID, and the frame ID associated to the transmission schedule ID (step S610). Thus, the present routine is finished.

As described above, the transmission device 20 of the present embodiment includes the receiving unit 42 and the transmission processing unit 46. The receiving unit 42 receives the transmission schedule information including the frame ID (frame identifier) of the frame to be transmitted, and the transmission parameter relating to the transmission timing of the frame. The transmission processing unit 46 transmits the frame identified by the frame ID to the receiving device 12, according to the transmission parameter included in the transmission schedule information.

In this manner, in the transmission device 20 of the present embodiment, the receiving unit 42 receives the transmission schedule information including the frame ID of the frame to be transmitted and the transmission time. In other words, the receiving unit 42 receives the transmission schedule information that includes the frame ID but that does not include the frame identified by the frame ID. The transmission processing unit 46 then transmits the frame identified by the frame ID to the receiving device 12, according to the transmission parameter.

In other words, in the transmission device 20 of the present embodiment, the transmission schedule information including the frame ID and the transmission time is received separately from the frame to be transmitted. Consequently, even when a frame with a high transmission priority is generated afterwards, the transmission device 20 of the present embodiment can flexibly change the transmission order and transmit the frame. In other words, with the transmission device 20 of the present embodiment, it is possible to change the transmission order of the frame afterwards, until just before the frame is transmitted to the receiving device 12.

Consequently, with the present embodiment, it is possible to provide the transmission device 20 capable of flexibly responding to a change in the transmission order.

Moreover, in the present embodiment, the receiving unit 42 in the transmission device 20 receives the transmission schedule information including the frame ID and the transmission time (transmission parameter), after the transfer unit 40 issues a transfer instruction of the frame to be transmitted to the second storage unit 41. The transmission processing unit 46 then transmits the frame identified by the frame ID to the receiving device 12, according to the transmission parameter included in the received transmission schedule.

Thus, even when the frame to be transmitted is transferred to the second storage unit 41 in the transmission device 20, the transmission device 20 of the present embodiment can flexibly respond to a change in the transmission time of the frame. Consequently, in addition to the effects described above, the transmission device 20 of the present embodiment can further flexibly respond to a change in the transmission order. Moreover, the transmission device 20 of the present embodiment can transmit a high-priority frame to the receiving device 12 at a low delay.

Second Embodiment

In the present embodiment, the transmission schedule information further includes an effective condition of the transmission schedule information, for example.

Figure 13:
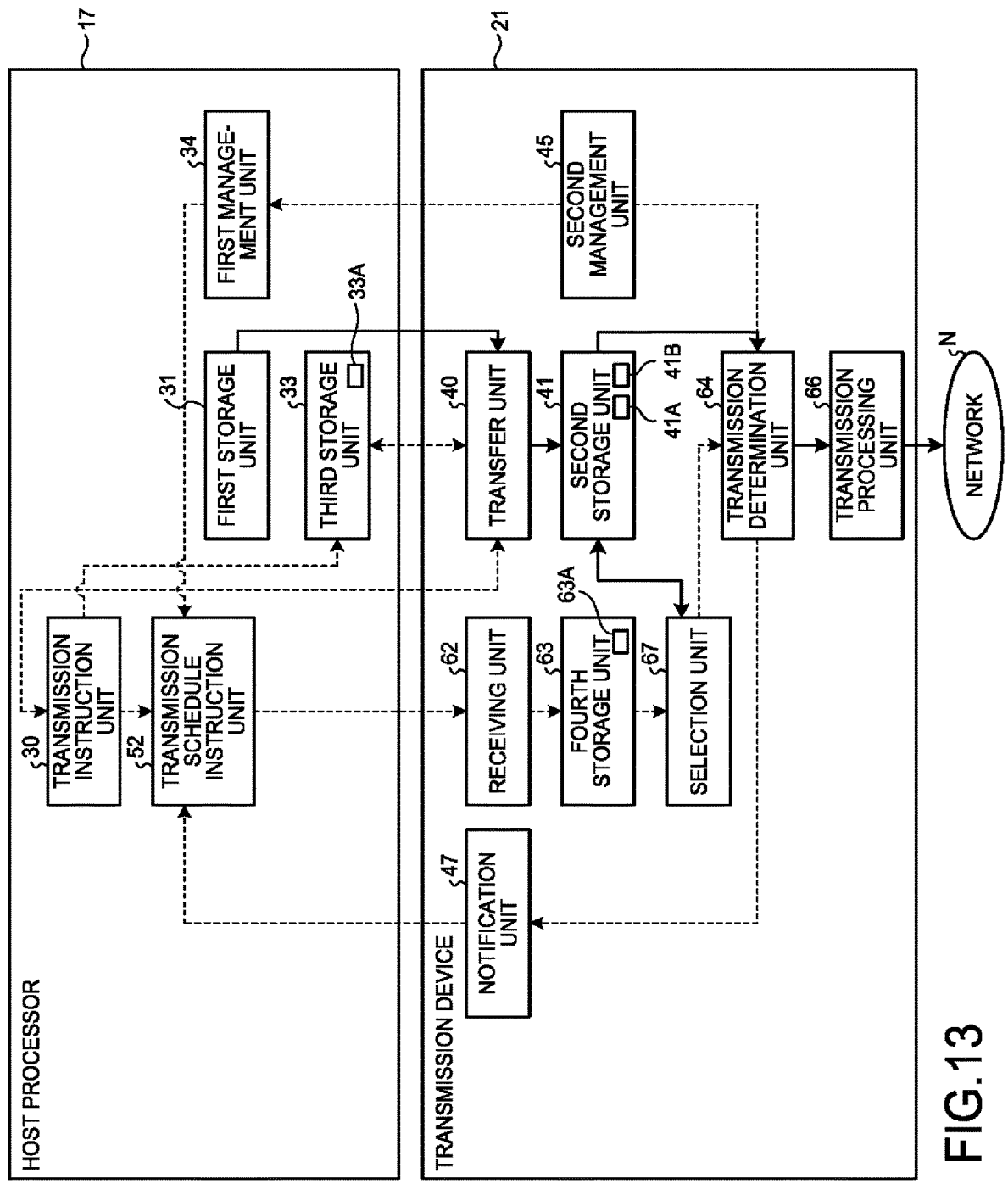
FIG. 13 is a schematic diagram of a functional configuration of a host processor and a transmission device.

FIG. 13 is a schematic diagram illustrating an example of a functional configuration of a host processor 17 and transmission device 21 of the present embodiment. The same functions as those of the host processor 16 and the transmission device 20 in the first embodiment denote the same reference numerals, and the detailed description thereof will be omitted.

The host processor 17 includes the transmission instruction unit 30, the first storage unit. 31, a transmission schedule instruction unit 52, the third storage unit 33, and the first management unit 34. The host processor 17 is the same as the host processor 16 in the first embodiment, except that the host processor 17 includes the transmission schedule instruction unit 52 instead of the transmission schedule instruction unit 32.

The transmission device 21 includes the transfer unit 40, the second storage unit 41, the second management unit 45, a receiving unit 62, a fourth storage unit 63, a transmission determination unit 64, and a transmission processing unit 66. The second storage unit 41 and the second management unit 45 are the same as those in the first embodiment.

Similar to the transmission schedule instruction unit 32 in the first embodiment, the transmission schedule instruction unit 52 in the host processor 17 notifies the transmission device 20 of the transmission schedule information, by using the data length and the frame ID received from the transmission instruction unit 30.

However, the transmission schedule information of the present embodiment further includes an effective condition of the transmission schedule information.

More particularly, the transmission schedule information of the present embodiment includes a transmission schedule ID, a frame ID, a transmission time, and an effective condition.

The effective condition is a condition for judging whether the transmission information is effective. For example, the effective condition indicates a limit of reception time at which the receiving unit 42 in the transmission device 20 receives the transmission information. In this case, the effective condition is expressed by time indicating the limit of reception time.

Consequently, in this case, when the receiving unit 42 receives the corresponding transmission schedule before the reception time indicated by the effective condition, the transmission schedule satisfies the effective condition. When the receiving unit 42 receives the corresponding transmission schedule after the reception time indicated by the effective condition, the transmission schedule does not satisfy the effective condition.

The type of the effective condition may be defined in advance, and is not limited to the limit of reception time. For example, the effective condition may also be a limit of writing time at which the transmission schedule information is written in the schedule DB 43A in the fourth storage unit 43.

Similar to the transmission schedule instruction unit 32 in the first embodiment, the transmission schedule instruction unit 32 calculates the transmission time of a frame identified by the frame ID, by using the data length, the frame ID, and the current time.

Moreover, the transmission schedule instruction unit 52 may generate an effective condition of a frame by using a predetermined rule.

For example, the transmission schedule instruction unit 52 generates the time prior to the calculated transmission time by a predetermined time as the effective condition. For example, the predetermined time may be obtained by defining in advance the minimum time or more that is required for the transmission device 21, from when the transmission schedule information is received to when the transmission schedule information is transmitted to the receiving device 12 via the network N.

The transmission schedule instruction unit 52 generates the effective condition of the transmission schedule information included in the transmission information, for each piece of transmission information. Moreover, similar to the first embodiment, the transmission schedule instruction unit 52 allocates the transmission schedule ID for each frame ID. Through these processes, the transmission schedule instruction unit 52 generates the transmission schedule information including the transmission schedule ID, the frame ID, and the transmission time. It is to be noted that a single piece of transmission schedule information includes a single transmission schedule ID, a single frame ID, and a single transmission time. Moreover, the single piece of transmission information includes one or more pieces of transmission schedule information, a single effective condition, and a single reception time. It is to be noted that the effective condition and the reception time may be generated for each piece or plural pieces of transmission schedule information.

The transmission schedule instruction unit 52 notifies the receiving unit 62 in the transmission device 21 of the transmission information including one or more pieces of the transmission schedule information. Similar to the first embodiment, the transmission information may further include the transmission ID for identifying the transmission information. In this case, the transmission information includes the transmission ID, and one or more pieces of the transmission schedule information. In contrast, the transmission information may not include the transmission ID. In the present embodiment, the transmission information includes a single transmission ID, and pieces of transmission schedule information, for example.

The receiving unit 62 in the transmission device 21 receives the transmission schedule information from the transmission schedule instruction unit 52 in the host processor 16. In other words, upon receiving the transmission information from the transmission schedule instruction unit 52, the receiving unit 62 receives the transmission schedule information included in the transmission information.

In the present embodiment, the receiving unit 62 provides a register interface corresponding to each of the transmission ID, the transmission schedule ID, the frame ID, the transmission time, and the effective condition, for the transmission schedule instruction unit 52. Consequently, after writing the transmission ID, the transmission schedule instruction unit 52 sequentially writes the transmission schedule ID, the frame ID, and the transmission time in each register of the receiving unit 62 in this order, for each piece of transmission schedule information. Thus, the transmission schedule instruction unit 52 registers the transmission information by setting each of the pieces of transmission schedule information in the receiving unit 62, and writing the effective condition in the end. When the effective condition is written, it is assumed that the registration of the transmission information is finished.

The interface between the receiving unit 62 and the transmission schedule instruction unit 52 is not limited to the form described above. For example, similar to the transfer unit 40, the receiving unit 62 may temporarily store the transmission schedule information in the memory, and acquire the transmission schedule information from the transmission schedule instruction unit 52 by the DMA transfer and the like.

The receiving unit 62 registers the transmission schedule information received from the transmission schedule instruction unit 52 in a schedule DB 63A in the fourth storage unit 63.

FIG. 14 is a schematic diagram illustrating an example of a data configuration of the schedule DB 63A. The schedule DB 63A is database that stores therein transmission schedule information. The data format of the schedule DB 63A is not limited to database.

As the schedule DB 63A, FIG. 14 illustrates database in which the transmission ID included in the transmission information, one or more pieces of transmission schedule information included in the transmission information, an effective condition of the transmission information, and the reception time of the transmission information are associated with each other.

Every time the transmission information is received from the transmission schedule instruction unit 52, the receiving unit 42 associates the transmission ID included in the received transmission information and the transmission schedule information included in the transmission information with each other. Then, the receiving unit 42 sequentially registers the transmission ID and the transmission schedule information in the schedule DB 63A. Consequently, for example, as illustrated in FIG. 14, the transmission schedule information is sequentially registered in the schedule DB 63A. Then, the time at which the reception of all the pieces of transmission information is finished is registered as the reception time.

Returning to FIG. 13, description will be continued. For the pieces of transmission schedule information received by the receiving unit 62, a selection unit 67 selects a single piece of transmission schedule information at every transmission time.

More particularly, from the pieces of transmission schedule information received by the receiving unit 62, the selection unit 67 selects the transmission schedule information that satisfies the effective condition. In other words, the selection unit 67 selects the transmission schedule information that satisfies the effective condition, for each of the one or more pieces of the transmission schedule information the transmission time of which is the same.

For example, it is assumed that the effective condition is the limit of reception time. In this case, the selection unit 67 may select the transmission schedule information in which the reception time is prior to the time indicated by the effective condition, from the pieces of transmission schedule information registered in the schedule DB 63A.

The pieces of transmission schedule information that satisfy the effective condition may sometime include the pieces of transmission schedule information having the same transmission time. In this case, the selection unit 67 may select the transmission schedule information that satisfies the effective condition, and that has the latest reception time of the receiving unit 62, front the pieces of transmission schedule information in which the transmission time is the same.

There is a case when the transfer of the frame identified by the frame ID included in the transmission schedule information selected by the selection unit 67 to the second storage unit 41 has not yet been completed, at the time of selection. The selection unit 67 may determine whether the transfer has not yet been completed, by judging whether the valid flag corresponding to the frame ID included in the selected transmission schedule information in the accompanying information storage area 41B is invalid "0". It is to be noted that the selection unit 67 may also determine that the transfer has not yet been completed, when the frame ID included in the selected transmission schedule information is not registered in the accompanying information storage area 41B.

In this case, instead of the selected transmission schedule information, the selection unit 67 selects another transmission schedule information that is received by the receiving unit 62 subsequent to the transmission schedule information. More particularly, the selection unit 67 selects another transmission schedule information indicating the reception time subsequent to the selected transmission schedule, from the transmission schedule information that satisfies the effective condition and that includes the same transmission time as the selected transmission schedule information.

In this manner, on the basis of the effective condition, the selection unit 67 selects the transmission schedule information including the frame ID of the frame to be transmitted next.

Figure 15:
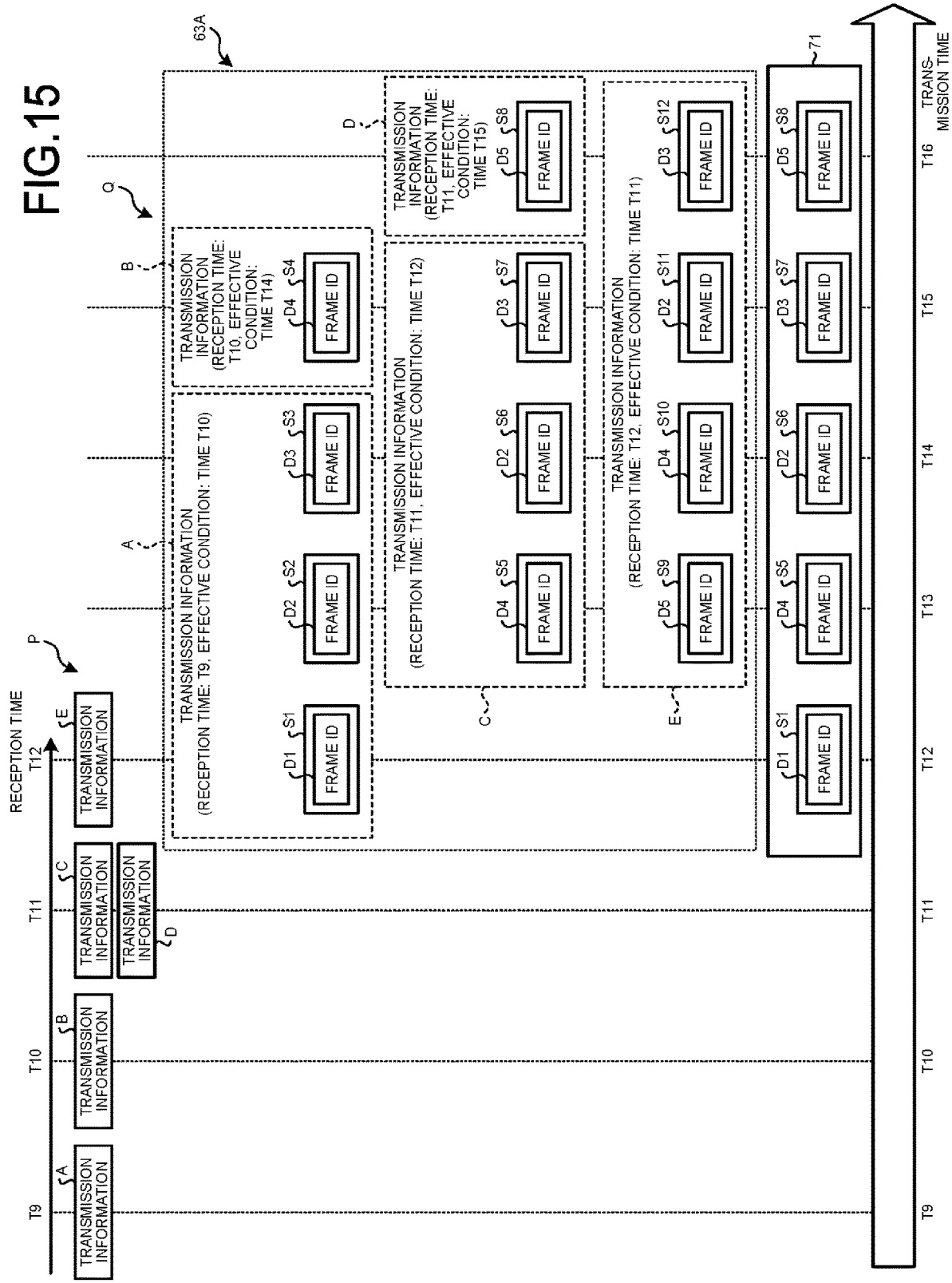
FIG. 15 is a diagram for explaining selections made by a selection unit.

FIG. 15 is a diagram for explaining a specific example of selections made by the selection unit 67.

For example, it is assumed that the receiving unit 62 has received five pieces of transmission information (referred to as transmission information A to transmission information E). These pieces of transmission information correspond to transmission information of transmission IDs "A" to "E" illustrated in FIG. 14. It is assumed that the time illustrated in FIG. 14 and FIG. 15 indicates a future time with an increase in the value, and indicates a past time with a decrease in the value.

It is assumed that the reception time of the transmission information A is "T9", the reception time of the transmission information B is "T10", the reception time of the transmission information C and the transmission information D is "T11", and the reception time of the transmission information E is "T12".

Then, as illustrated in FIG. 14 and FIG. 15, the transmission information A includes a plurality of pieces of transmission schedule information (transmission schedule information S1 to transmission schedule information 33). It is assumed that the reception time and the effective condition of the pieces of transmission schedule information included in the transmission information A are "T9" and "T10", respectively. The effective condition "T10" indicates that the reception limit of the receiving unit 62 is time "T10".

The transmission schedule information S1 to transmission schedule information S3 each include the transmission time "T12" and the frame ID "D1", the transmission time "T13" and the frame ID "D2", and the transmission time "T14" and the frame ID "D3".

The transmission information B includes the transmission schedule information 24. It is assumed that the reception time and the effective condition of the transmission schedule information 54 are "T10" and "T14", respectively. The effective condition "T14" indicates that the reception limit of the receiving unit 62 is time "T14".

The transmission schedule information 54 includes the transmission time "T15" and the frame ID "D4".

The transmission information C includes the pieces of transmission schedule information (transmission schedule information 35 to transmission schedule information 37). It is assumed that the reception time and the effective condition of the pieces of transmission schedule information included in the transmission information C are "T11" and "T12", respectively. The effective condition "T12" indicates that the reception limit of the receiving unit 62 is time "T12".

The transmission schedule information S5 to the transmission schedule information S7 each include the transmission time "T13" and the frame ID "D4", the transmission time "T14" and the frame ID "D2", and the transmission time "T15" and the frame ID "D3".

The transmission information D includes the transmission schedule information S8. It is assumed that the reception time and the effective condition of the transmission schedule information S8 are "T11" and "T15", respectively. The effective condition "T15" indicates that the reception limit of the receiving unit 62 is time "T15".

The transmission schedule information S8 includes the transmission time "T16" and the frame ID "D5".

Moreover, the transmission information E includes a plurality of pieces of the transmission schedule information (transmission schedule information S9 to transmission schedule information S12). It is assumed that the reception time and the effective condition of the pieces of transmission schedule information included in the transmission information E are "T12" and "T11", respectively. The effective condition "T11" indicates that the reception limit of the receiving unit 62 is time "T11".

The transmission schedule information S9 to transmission schedule information S12 each include the transmission time "T13" and the frame ID "D5", the transmission time "T14" and the frame ID "D4", the transmission time "T15" and the frame ID "D2", and the transmission time "T16" and the frame ID "D3".

In this case, it is assumed that the receiving unit 62 has received the transmission information A to the transmission information E from the transmission schedule instruction unit 52 in the host processor 17, within each reception time described above (see receiving state P in FIG. 15). These pieces of transmission information are then sequentially registered in the schedule DE 63A (see state Q of the schedule DB 63A in FIG. 14 and FIG. 15).

As described above, the selection unit 67 selects the transmission schedule information that satisfies the effective condition, from the pieces of transmission schedule information received by the receiving unit 62.

In the transmission schedule information S1 to the transmission schedule information 512, the transmission schedule information 59 to the transmission schedule information 312 that are included in the transmission information E, and in which the reception time "T12" indicates the time later than the effective condition "T11", do not satisfy the effective condition. Consequently, the selection unit 67 excludes the transmission schedule information 59 to the transmission schedule information S12 included in the transmission information E, from the objects to be selected.

Then, in the transmission schedule information 51 to the transmission schedule information S12, the selection unit 67 selects the transmission schedule information S1 to the transmission schedule information 38 that are included in the transmission information A to the transmission information D, and in which the reception time indicates the time prior to the effective condition, as the objects to be selected.

Then, for the transmission schedule information S1 to the transmission schedule information S8 to be selected, the selection unit 67 selects the transmission schedule information that has the latest reception time of the receiving unit 62, at each transmission time included in the transmission schedule information.

Consequently, the selection unit 67 selects the transmission schedule information S1 including the frame ID "D1", as the transmission schedule information corresponding to the transmission time "T12".

Moreover, as the transmission schedule information corresponding to the transmission time "T13", from the transmission schedule information S2 and the transmission schedule information S5 that satisfy the effective condition, the selection unit 67 selects the transmission schedule information S5 including the frame ID (for example the frame ID "D4") of the frame that has the latest reception time (closest to the current time). The latest reception time indicates that the frame is last written by the host processor 16.

Furthermore, as the transmission schedule information corresponding to the transmission time "T14", from the transmission schedule information S3 and the transmission schedule information S6 that satisfy the effective condition, the selection unit 67 selects the transmission schedule information S6 including the frame ID "D2" of the frame with the highest priority.

Still furthermore, as the transmission schedule information corresponding to the transmission time "T15", from the transmission schedule information S4 and the transmission schedule information S1 that satisfy the effective condition, the selection unit 67 selects the transmission schedule information S1 including the frame ID "D3" of the frame that has the latest reception time.

Still furthermore, as the transmission schedule information corresponding to the transmission time "T16", the selection unit 67 selects the transmission schedule information Se that satisfies the effective condition (includes the frame ID "D5").

Returning to FIG. 13, description will be continued. In this manner, the selection unit 67 selects the transmission schedule information to be transmitted at each transmission time, on the basis of the effective condition and the reception time.

The transmission determination unit 64 receives the transmission schedule information that is to be transmitted at the transmission time matching with the current time and that is selected by the selection unit 67, from the selection unit 67. The transmission determination unit 64 then reads out the frame identified by the frame ID included in the transmission schedule information from the frame storage area 41A of the second storage unit 41, and instructs the transmission processing unit 66 to transmit the frame.

The transmission processing unit 66 transmits the frame identified by the frame ID included in the transmission schedule information selected by the selection unit 67, to the receiving device 12. In other words, the transmission processing unit 66 transmits the frame received from the transmission determination unit 64 via the network N.

Then, similar to the transmission determination unit 44 in the first embodiment, the transmission determination unit 64 sets the valid flag corresponding to the frame ID of the transmitted frame to invalid "0". Moreover, similar to the transmission determination unit 44, the transmission determination unit 64 notifies the notification unit 4i of the transmission result information.

Next, an example of a procedure of an information process executed by the selection unit the transmission determination unit 64, and the transmission processing unit 66 of the present embodiment will be described.

Figure 16:
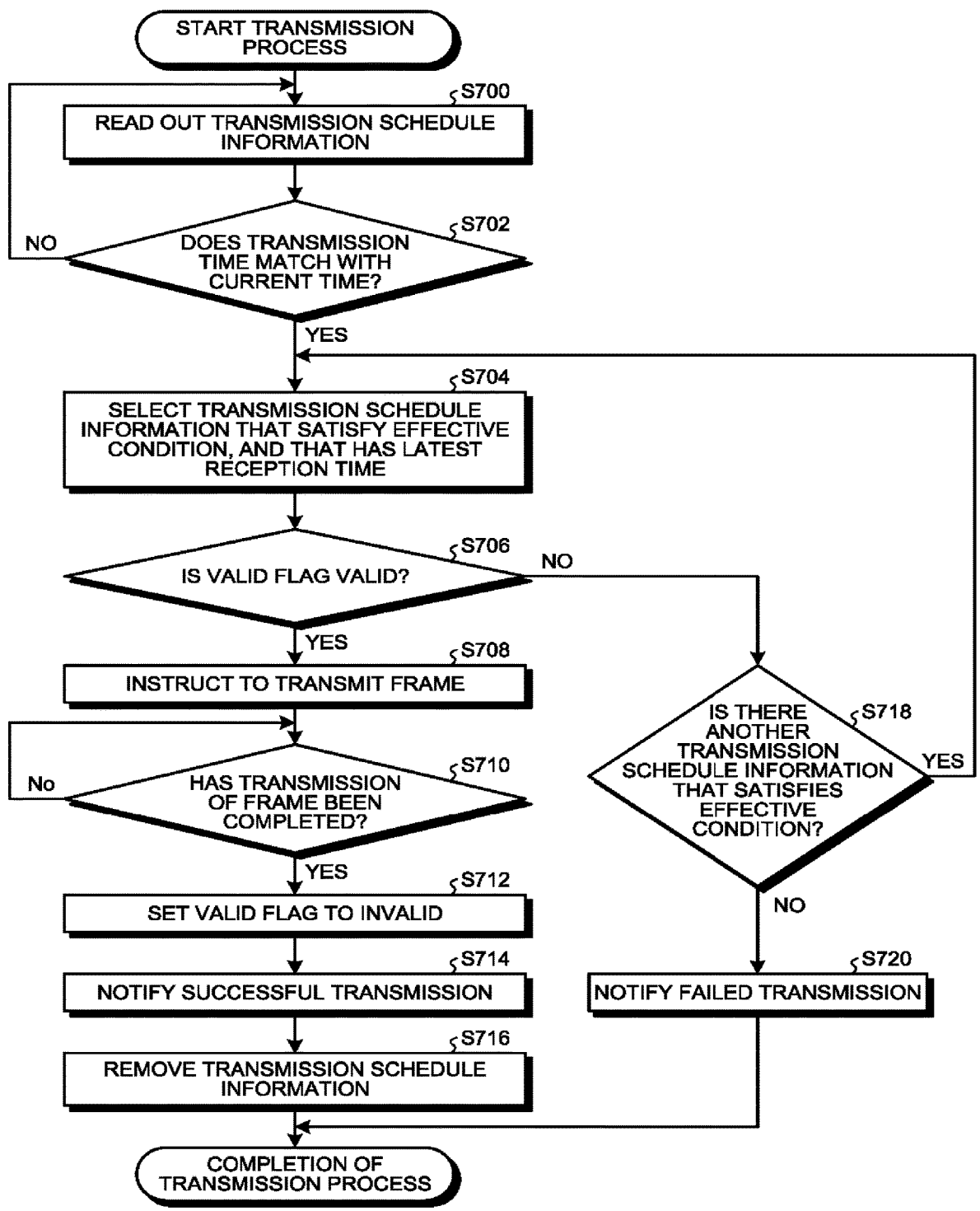
FIG. 16 is a flowchart of a transmission process.

FIG. 16 is a flowchart illustrating an example of a procedure of a transmission process executed by the selection unit 67, the transmission determination unit 64, and the transmission processing unit 66.

First, the selection unit 67 reads out the transmission schedule information from the schedule DB 63A in the fourth storage unit 6 (step S700). The selection unit 67 then determines whether the transmission time included in the transmission schedule information read out at step S700 matches with the current time (step S702). When a negative determination is made at step S702 (No at step S702), the process returns to step S700 described above. When a positive determination is made at step S702 (Yes at step S702), the process proceeds to step S704.

At step S704, from the pieces of transmission schedule information that are read out by the processes from step S700 to S702, and in which the transmission time matches with the current time, the selection unit 67 selects the transmission schedule information that satisfies the effective condition and that has the latest reception time (step S704).

Next, the selection unit 67 determines whether the valid flag corresponding to the frame ID included in the transmission schedule information selected at step S704 is valid or invalid (step S706).

When it determined that the valid flag is valid (Yes at step S706), the process proceeds to step S708. At step S708, the transmission determination unit 64 reads out the frame identified by the frame ID from the frame storage area 41A in the second storage unit 41, and instructs the transmission processing unit 66 to transmit the frame (step S708). By the process at step S708, the transmission processing unit 66 transmits the frame to the receiving device 12.

Next, the transmission determination unit 64 repeats the negative determination until it is determined that the transmission of the frame the transmission of which is instructed at step S700, to the receiving device 12 has been completed (No at step S710). When a positive determination is made at step S710 (Yes at step S710), the process proceeds to step S712.

At step S712, the transmission determination unit 64 sets the valid flag corresponding to the frame ID of the frame transmitted at step S710 in the accompanying information storage area 410, to invalid "0" (step S712). The transmission determination unit 64 then notifies the transmission schedule instruction unit 52 in the host processor 17 of the transmission result information including the transmission result indicating the successful transmission, via the notification unit 47 (step S711).

Next, the transmission determination unit 64 removes the transmission schedule information formed of a set of the frame ID of the frame transmitted at step S710 and the transmission time, from the schedule DB 63A (step S716). When the transmissions of all the pieces of transmission schedule information included in the transmission information are finished, the transmission determination unit 64 also removes the transmission information. Thus, the present routine is finished.

Upon receiving the transmission result information including the transmission result indicating the successful transmission from the notification unit 47, the transmission schedule instruction unit 52 may remove the transmission schedule information including the frame ID of the successfully transmitted frame and the transmission time, from the schedule DB 63A. In this case, the transmission schedule instruction unit 52 may notify the receiving unit 62 of the transmission schedule ID to be removed. Then, the receiving unit 62 may remove the transmission schedule information identified by the transmission schedule ID from the schedule DB 63A. Moreover, when the transmissions of all the pieces of transmission schedule information included in the transmission information are finished, the transmission schedule instruction unit 52 may notify the receiving unit 62 of the transmission ID of the object to be removed. Then, the receiving unit 62 may remove the transmission information identified by the transmission schedule ID from the schedule DB 63A.

On the other hand, when a negative determination is made at step S706 described above (No at step S706), the process proceeds to step S718. At step S718, the selection unit 67 determines whether there is another transmission schedule information that satisfies the effective condition (step 718).

When a positive determination is made at step S718 (Yes at step S718), the process returns to step S704 described above. On the other hand, when a negative determination is made at step S718 at step S718), the process proceeds to step S720.

At step S720, the transmission determination unit 64 notifies the transmission schedule instruction unit 52 in the host processor 17 of the transmission result information including the transmission result indicating time failed transmission, via the notification unit 47 (step S720). Thus, the present routine is finished.

As described above, the transmission device 21 of the present embodiment selects the transmission schedule information that satisfies the effective condition, from one or more pieces of the transmission schedule information received by the receiving unit 62. The transmission processing unit 66 then transmits the frame identified by the frame ID (frame identifier) included in the transmission schedule information to the receiving device 12, according to the transmission parameter (transmission time) included in the selected transmission schedule information.

In this manner, the transmission device 21 of the present embodiment transmits the frame identified by the frame ID included in the transmission schedule information selected according to the effective condition, to the receiving device 12. In other words, the transmission device 21 of the present embodiment uses the transmission schedule information including the effective condition. Consequently, in addition to the effects of the embodiment described above, the transmission device 21 of the present embodiment can suppress the delay caused by the generation of a frame that cannot be transmitted. Thus, it is possible to implement low-delay scheduling.

Thus, even when a high-priority frame is generated after the transmission time is set once, the transmission device 21 of the present embodiment can preferentially transmit the high-priority frame at a low delay, to the receiving device 12. Moreover, because the transmission information includes the effective condition, it is possible to suppress the transmission delay caused by the frame that does not satisfy the effective condition. Consequently, it is possible to transmit the high-priority frame to the receiving device 12 at a low delay. Furthermore, when it is not possible to preferentially transmit the high-priority frame, the transmission device 21 of the present embodiment can transmit the frame identified by the frame ID included in the other transmission schedule information. Consequently, the transmission device 21 can transmit the frame instructed to transmit at first, and can flexibly transmit the frame.

First Modification

In the embodiment described above, the transmission schedule instruction unit 32 and the transmission schedule instruction unit 52 notify the receiving unit 42 in the transmission device 20 or the receiving unit 62 in the transmission device 21 of the transmission schedule information, every time the frame transmission instruction is received.

However, the transmission schedule instruction unit 32 and the transmission schedule instruction unit 52 may also notify the receiving unit 42 or the receiving unit 62 of the transmission schedule information, only when the transmission schedule information needs to be changed.

Figure 17:
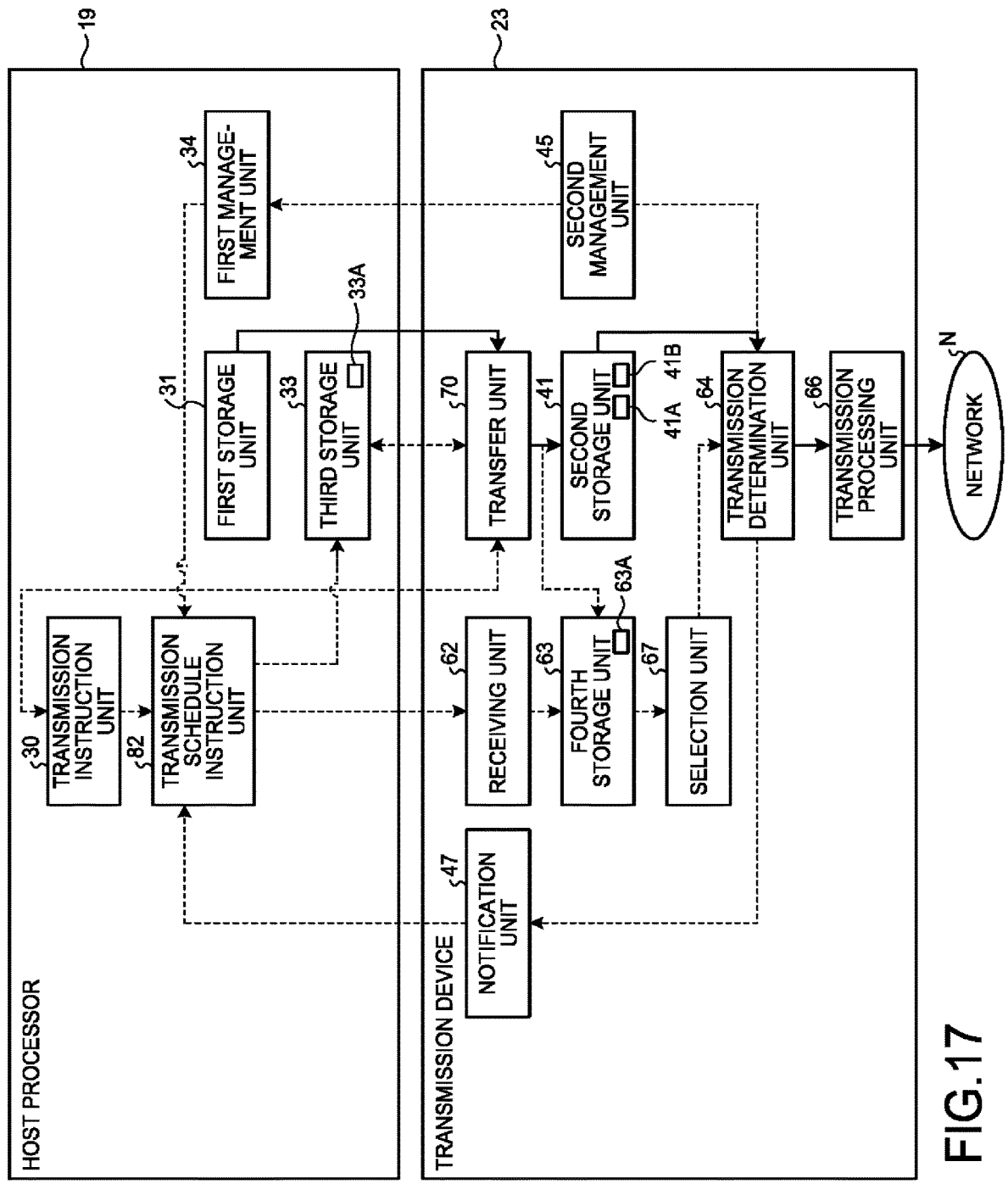
FIG. 17 is a schematic diagram of a functional configuration of a host processor and a transmission device.

FIG. 17 is a schematic diagram illustrating an example of a functional configuration of a host processor 19 and transmission device 23 of the present modification. The same functions as those of the host processor 17 and the transmission device 21 in the second embodiment denote the same reference numerals, and the detailed description thereof will be omitted.

The host processor 19 includes a transmission instruction unit 80, the first storage unit 31, a transmission schedule instruction unit 82, the third storage unit 33, and the first management unit 34. The host processor 19 is the same as the host processor 17 in the second embodiment, except that the host processor 19 includes the transmission instruction unit 80 and the transmission schedule instruction unit 82, instead of the transmission instruction unit 30 and the transmission schedule instruction unit 52.

The transmission device 23 includes a transfer unit 70, the second storage unit 41, the second management unit 45, the receiving unit 62, the fourth storage unit 63, the transmission determination unit 64, and the transmission processing unit 66. The transmission device 23 is the same as the transmission device 21 in the second embodiment, except that the transmission device 23 includes the transfer unit 70 instead of the transfer unit 40.

Unlike the transmission instruction unit 30, upon receiving a frame transmission instruction from an application, the transmission instruction unit 80 in the host processor 19 does not notify the transfer unit 40 of the transfer instruction. Similar to the transmission instruction unit 30, upon receiving a frame transmission instruction from an application, the transmission instruction unit 80 notifies the transmission schedule instruction unit 82 of the priority of the frame to be transmitted, the data length of the frame, and the frame ID applied to the frame that are indicated by the frame transmission instruction.

Similar to the transmission schedule instruction unit 52 in the second embodiment, upon receiving the notification from the transmission instruction unit 80, the transmission schedule instruction unit 62 in the host processor 19 calculates the transmission time of each frame ID, and generates transmission schedule information.

The transmission schedule instruction unit 82 then writes the descriptor 33A that further includes the calculated transmission time in the third storage unit 33, and notifies the transfer unit 70 in the transmission device 23 of the transfer instruction. Thus, in the present modification, the transfer instruction includes the number of the descriptor 33A that further includes the transmission time.

Similar to the transfer unit 40 in the second embodiment, the transfer unit 70 in the transmission device 23 transfers the frame to be transmitted to the second storage unit 41. Upon receiving the transfer instruction from the transmission schedule instruction unit 82 in the host processor 19, the transfer unit 70 transfers the frame indicated by the transfer instruction, from the first storage unit 31 in the host processor 19 to the second storage unit 41 in the transmission device 23.

The transfer unit 70 then registers the transmission schedule information including the frame ID and the transmission information that is included in the descriptor 33A read out during the transfer, in the schedule DB 63A in the fourth storage unit 63. In this process, the transmission schedule instruction unit 82 may further register the effective condition of the frame in the descriptor 33A. Through this process, the transfer unit 70 can register the transmission schedule information including the frame ID, the transmission information, and the effective condition, in the schedule DB 63A.

In a normal process, the transmission schedule instruction unit 82 writes the descriptor 33A including the transmission ID, the transmission schedule ID, the transmission time, and the effective condition, in the third storage unit 33.

When the transmission time calculated for the frame that is instructed to be transferred to the transfer unit 70 needs to be changed, the transmission schedule instruction unit 82 may calculate a new transmission time. Then, similar to the transmission schedule instruction unit 52 in the second embodiment described above, the transmission schedule instruction unit 82 may generate transmission schedule information, and notify the receiving unit 62 in the transmission device 20 of the transmission schedule information.

Moreover, when the effective condition is the limit of reception tune of the receiving unit 62, it is preferable that the effective condition (limit of reception time) of each of the pieces of transmission schedule information included in a single piece of transmission information is the same. In this case, the transmission schedule instruction unit 82 may also generate transmission information including the pieces of transmission schedule information indicating the same effective condition and the transmission ID, and notify the receiving unit 62 in the transmission device 21 of the transmission information.

As described above, in the present modification, in a normal process, the transmission schedule instruction unit 82 in the host processor 19 writes the descriptor 33A including the transmission time in the third storage unit 33, and notifies the transfer unit 70 of the transfer instruction, by notifying the transfer unit 70 of the number of the descriptor 33A. Then, when the transmission time needs to be changed, the transmission schedule instruction unit 82 generates new transmission schedule information applied with a changed transmission time, and notifies the receiving unit 62 in the transmission device 20 of the new transmission schedule information.

Consequently, in the present modification, it is possible to transmit a frame to the receiving device 12, by switching the processes between the normal process and when the transmission time needs to be changed.

Second Modification

The receiving unit 42 and the receiving unit 62 in the embodiments described above and in the first modification described above may also receive the transmission schedule information via a bus interface different from the transfer unit 40 and the transfer unit 70.

Figure 18:
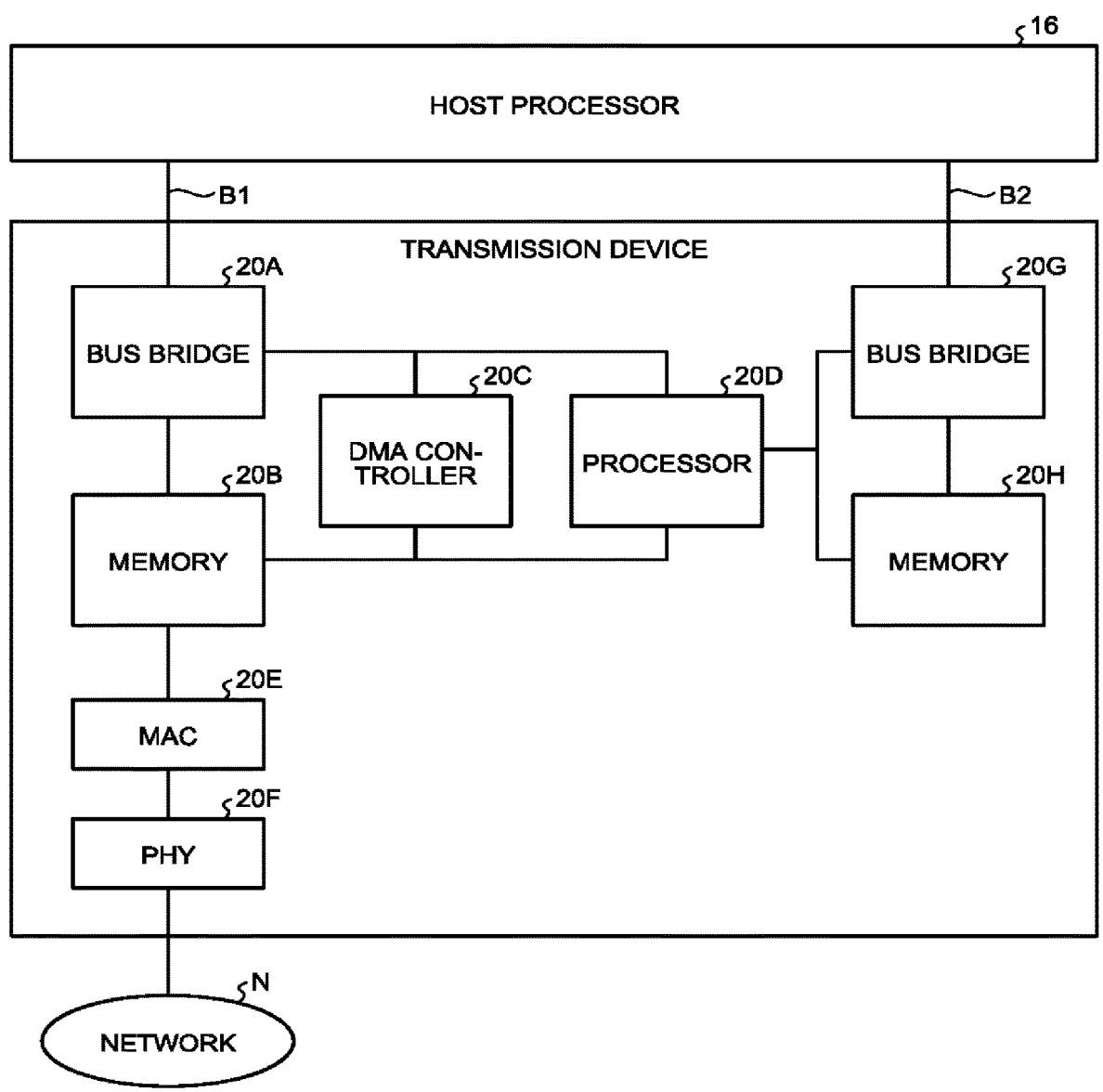
FIG. 18 is a schematic diagram of a hardware configuration of a transmission device.

In this case, the transmission device 20 may have a hardware configuration illustrated in FIG. 18. The transmission device 21 and the transmission device 23 may also have a hardware configuration illustrated in FIG. 18.

FIG. 18 is a schematic diagram illustrating an example of a hardware configuration of the transmission device 20.

The transmission device 20 includes the bus bridge 20A, the memory 20B, the DMA controller 20C, the processor 208, the MAC 20E, the PHY 20F, a bus bridge 20G, and a memory 20H. The bus bridge 20A, the memory 208, the DMA controller 20C, the processor 20D, the MAC 20E, and the PHY 20F are the same as those in the first embodiment. The memory 20B corresponds to the second storage unit 41 (see FIG. 3). Moreover, the memory 20H corresponds to the fourth storage unit 43 (see FIG. 3).

In the present modification, the memory 20B corresponding to the second storage unit 41 is connected to the first storage unit 31 (see FIG. 3) in the host processor 16, via the bus bridge 20A and a bus B1. In other words, the bus B1 is a dedicated bus for transferring a frame.

Moreover, the memory 20H corresponding to the fourth storage unit 43 is connected to the transmission schedule instruction unit 32 (see FIG. 3) in the host processor 16, via the bus bridge 20G. In other words, a bus B2 is a dedicated bus for transmitting transmission schedule information.

The type of the bus B1 and the bus B2 may be same or different.

Furthermore, as illustrated in FIG. 18, the memory 20H corresponding to the fourth storage unit 43 and the memory 20B corresponding to the second storage unit 41 may be different memories.

As described in the present modification, when the bus B1 for transferring a frame and the bus B2 for transmitting transmission schedule information are configured by buses that are physically different, it is possible to suppress the notification of the transmission schedule information to the transmission device 20 from being delayed by the frame transfer.

When the bus B1 for transferring a frame and the bus B2 for transmitting transmission schedule information are configured by buses that are physically the same, it is preferable to adjust the transfer method to avoid the bus from being occupied by the frame transfer. For example, it is preferable to control the host processor 16 so as to interrupt the frame transfer at every certain period, and notify the transmission device 20 of the transmission schedule information during the interrupted period.

For example, the transmission device 20, the transmission device 21, and the transmission device 23 in the embodiments and modifications described above may also be implemented by using a general-purpose computer device as basic hardware. In other words, in the functional configuration of the transmission device 20, the transmission device 21, and the transmission device 23 in the embodiments and modifications described above, the functions that can be implemented by a computer program may be implemented by causing a processor mounted on a computer device to execute the computer program. In this process, for example, the transmission device 20, the transmission device 21, and the transmission device 23 in the embodiments and modifications described above may also be implemented by installing a computer program in the computer device in advance. Moreover, for example, the transmission device 20, the transmission device 21, and the transmission device 23 in the embodiments and modifications described above may also be implemented by suitably installing a computer program stored in a storage medium such as a compact disc read-only memory (CD-ROM) in a computer device. Furthermore, for example, the transmission device 20, the transmission device 21, and the transmission device 23 in the embodiments and modifications described above may also be implemented by suitably installing a computer program distributed via a network in the computer device.

In this manner, the embodiments and modifications of the present invention have been described. However, the embodiments and modifications described above are merely examples, and are not intended to limit the scope of the invention. These novel embodiments may be implemented in various other forms, and various omissions, replacements, and modifications may be made without departing from the scope and spirit of the invention. These embodiments and modifications are included in the scope and spirit of the invention, and are included in the invention described in the claims and their equivalents.

For example, in the embodiments and modifications described above, the host processor 16, the host processor 17, and the host processor 19 each include the first storage unit 31. However, the second storage unit 41 may be provided outside the host processor 16, the host processor 17, and the host processor 19. Moreover, in the embodiments and modifications described above, the transmission device 20, the transmission device 21, and the transmission device 23 each include the second storage unit 41. However, the second storage unit 41 may be provided outside the transmission device 20, the transmission device 21, and the transmission device 23.

While certain embodiments have been described, these embodiments have been presented by way of example only, and are not intended to limit the scope of the inventions. Indeed, the novel embodiments described herein may be embodied in a variety of other forms; furthermore, various omissions, substitutions and chances in the form of the embodiments described herein may be made without departing from the spirit of the inventions. The accompanying claims and their equivalents are intended to cover such forms or modifications as would fall within the scope and spirit of the inventions.

What is claimed is:

1. A transmission device, comprising:
a receiving unit that receives transmission schedule information including a frame identifier uniquely identifying a frame stored in a storage unit and a transmission parameter relating to transmission timing of the frame; and
a transmission processing unit that transmits a frame uniquely identified by the frame identifier to a receiving device, according to the transmission parameter included in the transmission schedule information, wherein
the frame is a unit of data transmission via a network;
the transmission schedule information further includes an effective condition of the transmission schedule information;
the effective condition is indicative of a limit of a reception time at which the receiving unit receives the transmission schedule information;
the transmission device further comprises a selection unit that selects transmission schedule information that satisfies the effective condition, from one or more pieces of the transmission schedule information received by the receiving unit; and
the transmission processing unit transmits the frame identified by the frame identifier included in the transmission schedule information to the receiving device, according to the transmission parameter included in the transmission schedule information that is selected.

2. The transmission device according to claim 1, wherein when pieces of transmission schedule information including the same transmission parameter are included in pieces of transmission schedule information that are received by the receiving unit and that satisfy the effective condition, from among the pieces of transmission schedule information, the selection unit selects the transmission schedule information that has a latest reception time at which the receiving unit receives the transmission schedule information.

3. The transmission device according to claim 2, wherein when transfer of the frame identified by the frame identifier included in the selected transmission schedule information to the storage unit is not completed, the selection unit selects another of the transmission schedule information that satisfies the effective condition and that is received by the receiving unit subsequent to the selected transmission schedule information.

4. A communication device, comprising:
a host processor; and
a transmission device that communicates with the host processor, wherein
the transmission device comprises:
a receiving unit that receives transmission schedule information including a frame identifier uniquely identifying a frame stored in a storage unit and a transmission parameter relating to transmission timing of the frame, from the host processor; and
a transmission processing unit that transmits a frame uniquely identified by the frame identifier to a receiving device, according to the transmission parameter included in the transmission schedule information, wherein
the frame is a unit of data transmission via a network;
the transmission schedule information further includes an effective condition of the transmission schedule information:
the effective condition is indicative of a limit of a reception time at which the receiving unit receives the transmission schedule information:
the transmission device further comprises a selection unit that selects transmission schedule information that satisfies the effective condition, from one or more pieces of the transmission schedule information received by the receiving unit; and
the transmission processing unit transmits the frame identified by the frame identifier included in the transmission schedule information to the receiving device, according to the transmission parameter included in the transmission schedule information that is selected.

5. A communication system, comprising:
a communication device; and
a receiving device that communicates with the communication device via a network, wherein.
the communication device comprises:
a host processor, and
a transmission device that communicates with the host processor, wherein
the transmission device comprises:
a receiving unit that receives transmission schedule information including a frame identifier uniquely identifying a frame stored in a storage unit and a transmission parameter relating to transmission timing of the frame, from the host processor, and
a transmission processing unit that transmits a frame identified by the frame identifier to the receiving device, according to the transmission parameter included in the transmission schedule information, wherein
the frame is a unit of data transmission via the network;
the transmission schedule information further includes an effective condition of the transmission schedule information;
the effective condition is indicative of a limit of a reception time at which the receiving unit receives the transmission schedule information;
the transmission device further comprises a selection unit that selects transmission schedule information that satisfies the effective condition, from one or more pieces of the transmission schedule information received by the receiving unit; and
the transmission processing unit transmits the frame identified by the frame identifier included in the transmission schedule information to the receiving device, according to the transmission parameter included in the transmission schedule information that is selected.

6. A transmission method, comprising:
receiving transmission schedule information including a frame identifier uniquely identifying a frame stored in a storage unit and a transmission parameter relating to transmission timing of the frame, and transmitting a frame uniquely identified by the frame identifier to a receiving device, according to the transmission parameter included in the transmission schedule information, wherein the frame is a unit of data transmission via a network;

the transmission schedule information further includes an effective condition of the transmission schedule information;

the effective condition is indicative of a limit of a reception time at which the transmission schedule information is received;

the method further comprises selecting transmission schedule information that satisfies the effective condition, from one or more pieces of the transmission schedule information received; and the transmitting includes transmitting the frame identified by the frame identifier included in the transmission schedule information to the receiving device, according to the transmission parameter included in the transmission schedule information that is selected.

7. A computer program product having a non-transitory computer-readable medium including instructions, wherein the instructions, when executed by a computer, cause the computer to perform:

receiving transmission schedule information including a frame identifier uniquely identifying a frame stored in a storage unit and a transmission parameter relating to transmission timing of the frame; and transmitting a frame uniquely identified by the frame identifier to a receiving device, according to the transmission parameter included in the transmission schedule information, wherein the frame is a unit of data transmission via a network;

the transmission schedule information further includes an effective condition of the transmission schedule information;

the effective condition is indicative of a limit of a reception time at which the transmission schedule information is received;

the instructions cause the computer to further perform selecting transmission schedule information that satisfies the effective condition, from one or more pieces of the transmission schedule information received; and the transmitting includes transmitting the frame identified by the frame identifier included in the transmission schedule information to the receiving device, according to the transmission parameter included in the transmission schedule information that is selected.

* * * * *